US010304106B2

(12) United States Patent
Paul et al.

(10) Patent No.: US 10,304,106 B2
(45) Date of Patent: *May 28, 2019

(54) CONSUMER PRODUCTS

(71) Applicant: NIKE, Inc., Beaverton, OR (US)

(72) Inventors: Tiffany L. Paul, Portland, OR (US); Heather A. Mahoney, Portland, OR (US); Michael J. Wood, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 1057 days.

This patent is subject to a terminal disclaimer.

(21) Appl. No.: 14/322,608

(22) Filed: Jul. 2, 2014

(65) Prior Publication Data

US 2014/0316995 A1 Oct. 23, 2014

Related U.S. Application Data

(63) Continuation of application No. 12/826,390, filed on Jun. 29, 2010, now Pat. No. 8,788,365.

(60) Provisional application No. 61/221,893, filed on Jun. 30, 2009.

(51) Int. Cl.
*G06Q 10/10* (2012.01)
*G06Q 30/04* (2012.01)
*G06Q 10/06* (2012.01)
*G06Q 30/06* (2012.01)
*G06Q 30/02* (2012.01)

(52) U.S. Cl.
CPC ....... *G06Q 30/0621* (2013.01); *G06Q 10/101* (2013.01); *G06Q 30/02* (2013.01); *G06Q 30/0261* (2013.01); *G06Q 30/0623* (2013.01)

(58) Field of Classification Search
CPC .................................................. G06Q 10/101
USPC ................................................. 705/1.1–912
See application file for complete search history.

(56) References Cited

U.S. PATENT DOCUMENTS

| | | | |
|---|---|---|---|
| 6,751,620 B2 | 6/2004 | Orbanes et al. |
| 7,216,092 B1 | 5/2007 | Weber et al. |
| 7,251,031 B2 | 7/2007 | Lewis et al. |
| 8,090,461 B2 | 1/2012 | Ohiaeri et al. |
| 8,175,931 B2 | 5/2012 | Harvill et al. |
| 2001/0044758 A1 | 11/2001 | Talib et al. |
| 2002/0126328 A1 | 9/2002 | Lehmeier et al. |
| 2002/0143655 A1 | 10/2002 | Elston et al. |
| 2005/0138078 A1 | 6/2005 | Christenson et al. |
| 2005/0177453 A1 | 8/2005 | Anton et al. |
| 2005/0289018 A1 | 12/2005 | Sullivan et al. |
| 2006/0215012 A1 | 9/2006 | De Ruyter |
| 2007/0100802 A1 | 5/2007 | Celik |

(Continued)

FOREIGN PATENT DOCUMENTS

| | | |
|---|---|---|
| JP | 2002189844 A | 7/2002 |
| JP | 2003298784 A | 10/2003 |

(Continued)

OTHER PUBLICATIONS

Oct. 21, 2010—(WO) ISR and WO—App. No. PCT/US2010/040430.

Kleenex launches personalized packaging, Mar. 5, 2007, Raucher Press, Inc., vol. 29, Issue 5.

*Primary Examiner* — Jonathan P Ouellette
(74) *Attorney, Agent, or Firm* — Banner & Witcoff, Ltd.

(57) ABSTRACT

Computer based systems and methods allow designing (e.g., customization) of consumer products, such as articles of footwear, apparel, athletic equipment, etc., by users.

20 Claims, 26 Drawing Sheets

(56) References Cited

U.S. PATENT DOCUMENTS

| | | | |
|---|---|---|---|
| 2008/0077415 A1* | 3/2008 | Shannon | G06Q 10/101 |
| | | | 705/300 |
| 2008/0154747 A1 | 6/2008 | Tarbell et al. | |
| 2008/0249898 A1 | 10/2008 | Ratnakar | |
| 2009/0112467 A1 | 4/2009 | Jiang et al. | |
| 2009/0144639 A1 | 6/2009 | Nims et al. | |
| 2009/0150218 A1 | 6/2009 | Brunner et al. | |
| 2009/0198571 A1 | 8/2009 | Hanechak et al. | |
| 2016/0210602 A1* | 7/2016 | Siddique | G06Q 20/0453 |

FOREIGN PATENT DOCUMENTS

| | | |
|---|---|---|
| JP | 2004104532 A | 4/2004 |
| JP | 2006517314 A | 7/2006 |
| JP | 2007267996 A | 10/2007 |
| JP | 2008041035 A | 2/2008 |
| KP | 1020020082517 | 10/2002 |
| KP | 1020030025402 | 3/2003 |
| WO | 2006088551 A1 | 8/2006 |
| WO | 2009046424 A2 | 4/2009 |

* cited by examiner

Fig. 6

CONSUMER PRODUCTS

CONTINUING APPLICATION DATA

This application is a continuation of U.S. patent application Ser. No. 12/826,390 filed Jun. 29, 2010, which claims priority benefits of U.S. Provisional Patent Appln. No. 61/221,893 filed Jun. 30, 2009 in the names of Tiffany L. Paul, Heather A. Mahoney and Michael J. Wood and entitled "Design of Consumer Products." Both of these applications are entirely incorporated herein by reference.

FIELD OF THE INVENTION

The present invention relates to systems, methods, and computer generated user interfaces for design of (e.g., customization of) consumer products, such as articles of footwear, articles of apparel, and athletic equipment (e.g., bags, gloves, watches, socks, uniforms, protective equipment, pads, team gear, etc.).

BACKGROUND OF THE INVENTION

Recent years have ushered in dramatic advancements in electronic computing devices and their capabilities, including dramatic advances in the information readily available to such devices (e.g., over the Internet or other networked connections) and communications capabilities between such devices, including hand-held devices and mobile devices. While advances have been made, certain drawbacks still remain. The present invention takes advantage of these technological advances in the on-line commerce field and provides features not currently available in prior systems.

BRIEF SUMMARY OF THE INVENTION

Various aspects of this invention relate to systems and methods for designing (e.g., customization of) consumer products, such as articles of footwear, by users of computing devices. Various users may participate in an on-line or other computer communicative session to create and buy customized products.

Additional aspects of this invention relate to user interfaces provided on computing devices that allow users to design consumer products, such as articles of footwear. Each user's computing device may generate a user interface that displays a rendering of the product being designed as the design is being made. The user interfaces are generated by computer readable media including computer executable instructions stored thereon for generating a desired user interface on a display device, wherein the computer executable instructions provide systems and methods and accept users' input for product (e.g., footwear) design.

While described above in conjunction with articles of footwear, aspects of this invention also may be practiced in conjunction with design of other products, such as apparel (including athletic apparel, uniforms, etc.) and athletic equipment (such as balls, bats, gloves, bags, protective equipment, team gear, pads, hockey sticks, watches, socks, etc.).

BRIEF DESCRIPTION OF THE DRAWINGS

The above-noted and other features and aspects of the invention will become more apparent from the following detailed description, when considered in conjunction with the appended drawings, wherein:

FIG. 6 illustrates an example registration user interface screen in accordance with aspects of this invention.

DETAILED DESCRIPTION OF THE INVENTION

Figure 1:
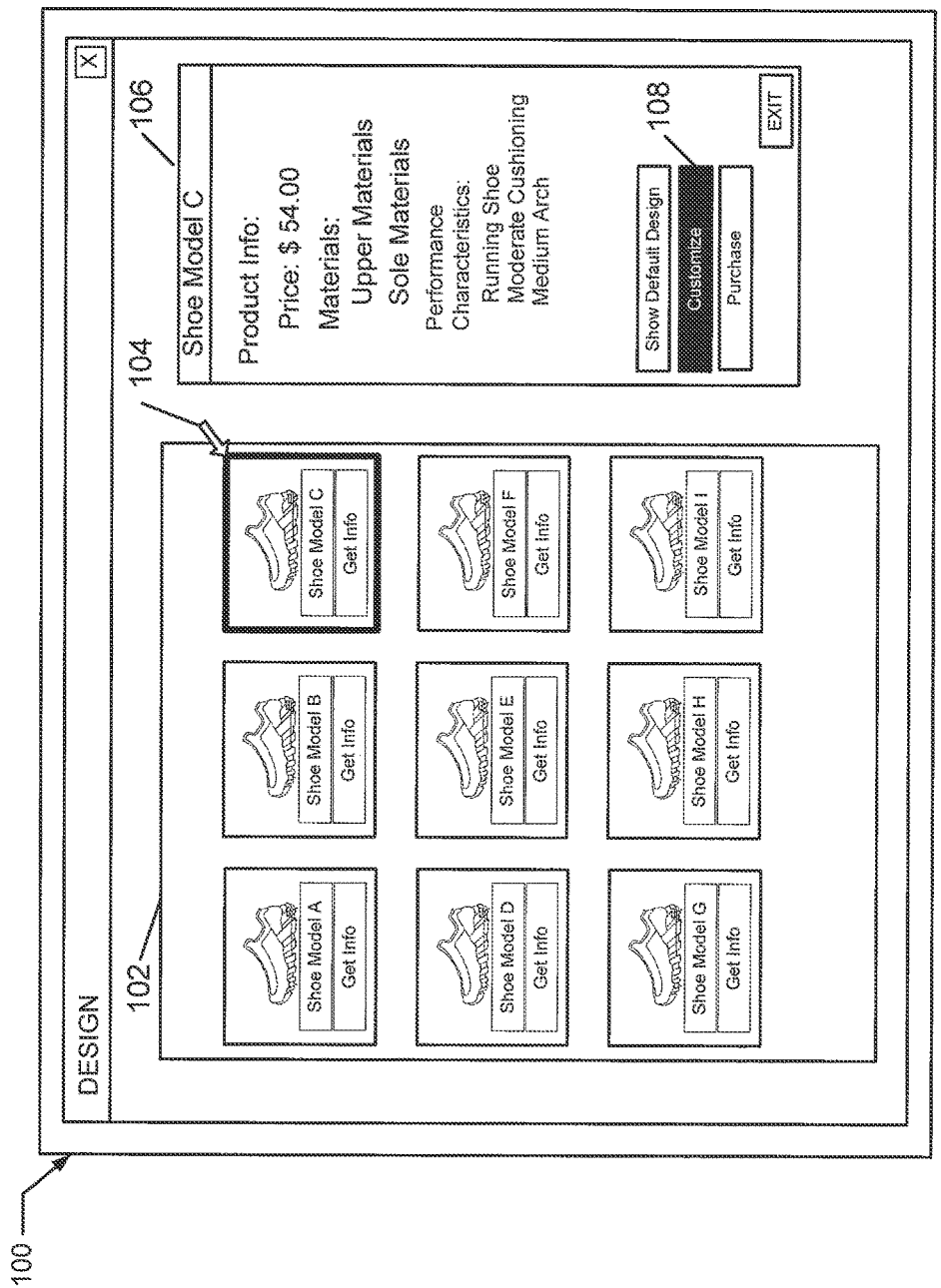
FIGS. 1-2 illustrate example user interface screens through which product customization functionality in accordance with examples of this invention may be launched.

I. General Description of Design Systems and Methods According to Examples of this Invention In general, as described above, some aspects of this invention relate to systems and methods for designing consumer products, such as articles of footwear, apparel, and/or athletic equipment.

Any desired type of footwear design data may be controlled, altered, or customized by a user of systems and methods according to this invention, such as: a color of a portion of the article of footwear (e.g., the various upper portions or elements, the various midsole portions or elements, the various outsole portions or elements, etc.); pictorial or other graphical data that may be printed or otherwise provided on the shoe, including the picture or graphical data itself (i.e., so the picture or graphic can be generated), as well as data identifying the desired location for the picture or graphic on the shoe, the picture or graphic size, the picture or graphic orientation, etc.; logo data that may be provided on the shoe (e.g., the footwear manufacturer's logo, a team or group logo, etc.), including the logo data itself (i.e., so the logo can be generated), as well as data identifying the desired logo location on the shoe, the desired logo size, the desired logo color(s), the desired logo orientation, etc.; textual data that may be provided on the shoe, including the textual data itself (i.e., so the text can be generated), as well as data identifying the desired text location, the desired text size, the desired text color, the desired text orientation, the text font, etc. If desired, systems and methods according to at least some examples of this invention further may allow a user to select from a variety of materials or other characteristics for various portions of the article of footwear, such as different upper material(s); midsole material(s); outsole material(s); upper thickness(es); midsole thickness(es); outsole thickness(es); midsole stiffness characteristics (such as the stiffness of foam, fluid-filled bladders, or other materials making up the midsole); outsole tread patterns; arch support characteristics; impact-attenuation characteristics; size, orientation, and/or location of openings or windows in the outsole, midsole, and/or upper; patterns of openings provided in the outsole, midsole, and/or uppers; laser cutting designs and/or characteristics; laser etching designs and/or characteristics; etc.

While described above in conjunction with design of articles of footwear, aspects of this invention also may be used for design of other consumer products, such as articles of apparel, athletic equipment, etc.

In the footwear example, a user may be permitted to select various features of the footwear and manipulate the visual image of the footwear from a website that is displayed on the user interface. The user interface may display one or more tools for changing aspects of or otherwise manipulating various design data of the footwear, as described above. Some design tools may include features like a color palette or color menu that allows users to change a color of a selected portion of the article of footwear; one or more orientation elements that allow users to change an orientation of the article of footwear as rendered in the first display portion; one way, two way, or multi-way user communication elements or features (such as textual input and display panel(s), instant messaging capabilities, audio and/or video communication capabilities, etc.); etc.

Users may use computing devices to access the design website. The computing devices establish a communication channel within a network and communicate with a messaging server system (comprising one or more server computers) that provide interactive design features used to change the design of a product. Any desired communication link and communication protocol may be used to provide and control the data exchange between computing devices and the system. Users may use a computing device to connect to the online design system via a network, such as the Internet, a local area network (LAN), a wide area network (WAN), or the like. Users may connect their computing devices to the system via any communication channel, such as website portals and applications from various social networking websites that link to the website portal of the manufacturer.

Any desired types of computing devices may be used without departing from this invention, such as any computing device capable of establishing a networked connection and/or a peer-to-peer connection and capable of providing the necessary display, user interface, and input capabilities, as will be described in more detail below. Some more specific examples of computing devices that may be used in systems and methods in accordance with at least some examples of this invention include, but are not limited to: desktop computers, personal computers, laptop computers, palmtop computers, handheld computers, cellular telephones, any other mobile devices or smartphones, personal digital assistants, computer workstations, televisions, and the like.

Computing devices that may be used in systems and methods in accordance with examples of this invention may include one or more input devices and a data processing system (e.g., including one or more microprocessors). Examples of input devices that may be included with the computing devices include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, the computing devices may have "touch screen" capabilities, such that a user input data into the computing device by physically touching the screen of the display with the user's fingers or a selection device, such as a stylus. Additionally, any desired type of display device may be provided for use in conjunction with the computing devices of systems and methods according to this invention, including display devices integrated with the computing device itself or display devices separate from the computing devices but in communication therewith, such as projector displays, separate monitor displays, etc.

The computing devices may be connected to a network in any desired manner without departing from this invention, including in conventional manners that are known and used in the art, such as any conventional wired or wireless connection and using any network connection protocol. Systems and methods in accordance with examples of this invention also will provide a user interface display on the user's computing device. This interface will allow the user to see the subject matter of the design effort and will allow the user to introduce his/her input to the design effort. The user interfaces on various devices will be provided and controlled by the user's computing device and/or by the server system, and data for generating, maintaining, and receiving input through the user interfaces will be generated and provided via computer readable media included as part of or associated with the computing device and/or the server system. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

The software for generating the user interface may reside on computer readable media present on or available to the computing device or server system. Alternatively, if desired, the software, or at least some portion(s) thereof, may reside on more than one computing device or server system. The sever system may be operated and maintained by the same organization(s) or individual(s) that operate and maintain the computing device and/or network, or the server system may be operated, controlled, and maintained by a party separate from any or all of these entities. As some more specific examples, the server system may be operated and maintained (and the user interface software also may be operated and maintained) by one or more entities whose products are being marketed through the design systems and methods described below (e.g., a manufacturer, a retailer, a vendor selected by a manufacturer or retailer, etc.).

Given this general background and information, more detailed information regarding specific examples of systems, methods, computer-readable media, and user interfaces in accordance with this invention will be described in more detail below. It should be understood that this more detailed description relates to various specific examples of the invention and their features and functionality, and this description should not be construed as limiting the invention.

II. Specific Examples of Design Systems and Methods According to Examples of this Invention Various features of product design systems, methods, and user interfaces (e.g., generated by a computing device for accepting user input and providing a user with information regarding the design) will be described in more detail below. Those skilled in the art will appreciate that the following description and the attached drawings merely represent examples of potential features, functionality, arrangement of interface components, orientation of interface components, combinations of interface components, and the like, of systems, methods, and user interfaces in accordance with this invention.

In at least some examples of this invention, a design session may be launched or initiated from an individual user's visit to a website, such as via a website of a manufacturer of the product being designed. FIG. 1 illustrates an example user interface screen 100 (as may be generated on a computing device) in which a user is involved in an on-line design experience for shoes. On-line design websites may display various products available for custom design, e.g., in one portion of the interface display 100, such as product display panel 102, which shows a variety of footwear products, in various different models, etc., optionally from various different manufacturers and/or retailers. These various different models of the product (footwear) may include template or "base" models that are available for a user to select as the first step of the design process. Such "base" models or templates may be added to or changed based on the user's selections during the design process. User input may be accepted in such systems and user interfaces, e.g., through a mouse, trackball, keyboard, rollerball, touch screen, stylus, joystick, etc., and a user may be allowed to interact with the interface and make selections using a selection device, like pointer device 104 controlled by a computer mouse or other input device. In the illustrated example display 100, the user has selected "Shoe Model C" and the product information panel 106 provides information about this selected product. Any desired product information may be provided without departing from this invention.

If desired, user interfaces for websites may be provided with one or more ways to launch product customization systems and methods. This is shown in the example of FIG. 1 as a "Customize" button 108 that the user can select (selection shown by blackening the button 108 in FIG. 1) in order to launch a product customization session.

Product design customization also may be initiated from other web-sites or other on-line experiences without departing from this invention, such as through direct interaction with a dedicated product design website, through a product manufacturer's website, etc.

Figure 2:
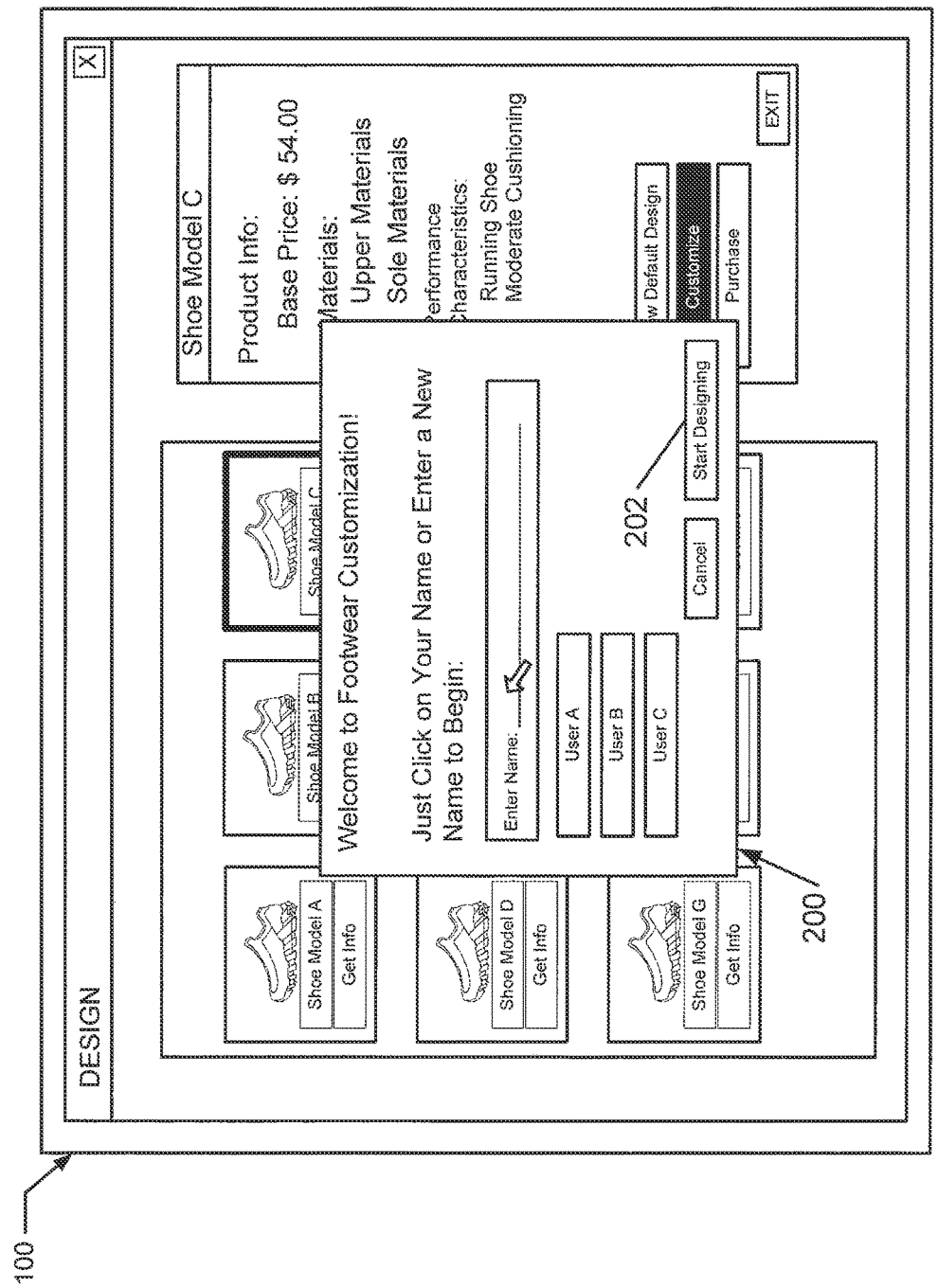

FIG. 2 illustrates an example of a user interface response that might take place as a result of initiation of a footwear product customization system and method as described above in conjunction with FIG. 1. In this illustrated example, an overlay screen portion or text box 200 is provided that requests information from the user in order to launch the customization session. For example, the box 200 may request entry of the user's name, email address, account number, user ID, password, credit card number, etc. The request(s) for information may be provided to the user in any desired manner or format without departing from this invention, such as via text input boxes, drop down listings, lists, icons, buttons, etc. Once all necessary or desired information is input, the customization session can be launched by user input at the "Start Designing" icon 202 (or in any other desired manner). Optionally, if desired, a customization session can be launched directly from the screen of FIG. 1, without the need for input of this type of additional information, without departing from this invention. This may be done, for example, if the customization system will allow the process to be performed anonymously, if the ID information for the computer starting the session is already stored and available from a previous customization session, etc. Also, ways of requesting this information using other than an overlay or text box 200 may be used without departing from this invention, such as transfer to a new website, launching of new application program and/or its user interface, etc.

Figure 3:
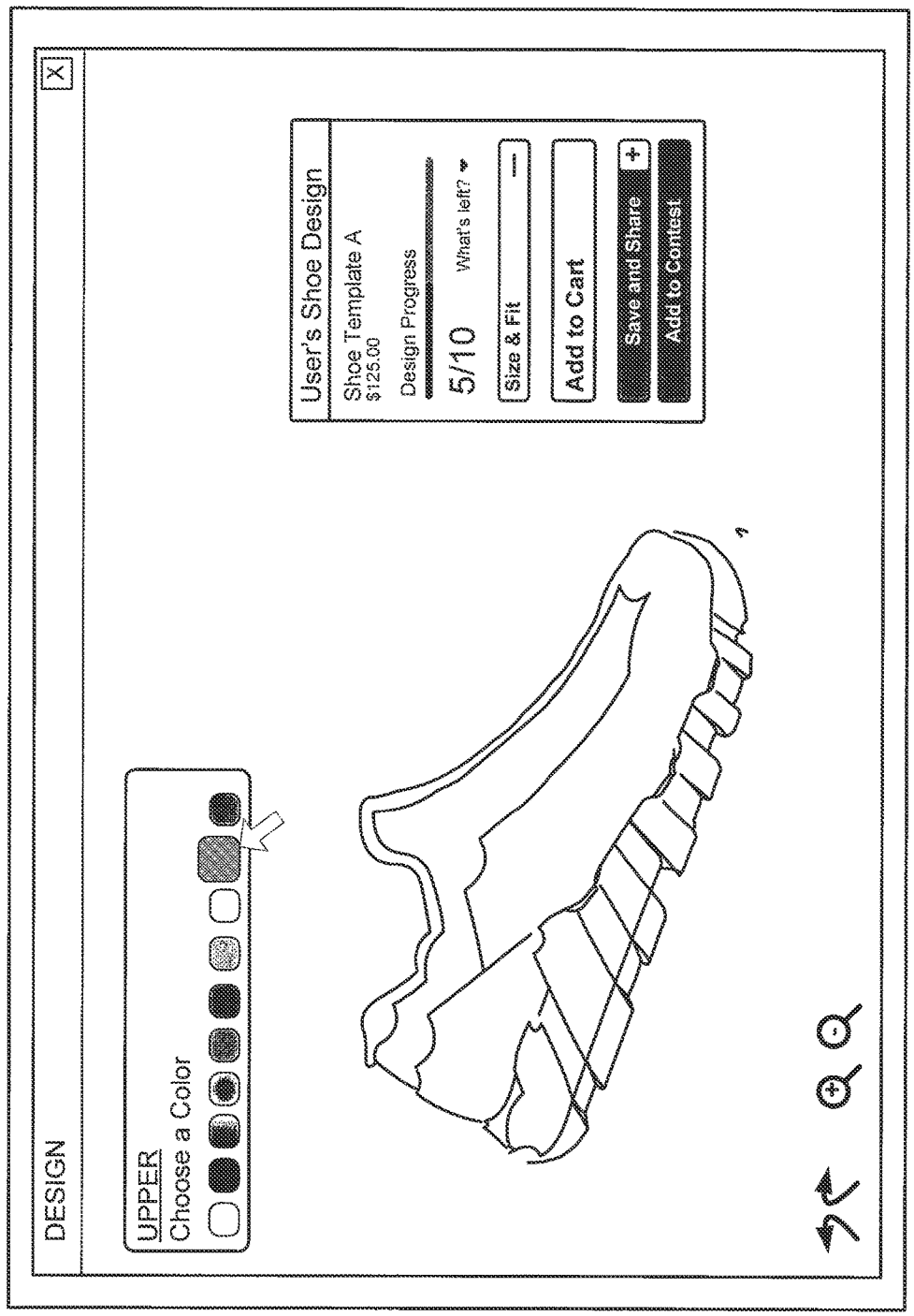
FIG. 3 illustrates an example user interface screen with custom design features available.

Initiation of a design session may result in generation of a Customization Session Identification Number (e.g., a unique "Session ID") for the session (e.g., by a server or other computing device that will be in control of the session and the transfer of data relating to the session). Also, initiation of a design session may result in the launch of a new customization webpage or website or a customization application program, e.g., to create an example user interface screen 300 like that shown in FIG. 3. The user interface 300 may include various customization features, in any desired arrangement, orientation, or display, without departing from this invention. In this illustrated example, the user interface 300 includes a portion 302 in which the product being customized appears, a "color palette" portion 304 for selecting colors for various parts, one or more controllers 306 for changing the appearance or view of the product in portion 302 (such as rotation controls, zoom-in, zoom-out, change in views shown, etc.), an "undo" control (to eliminate the last action), a "redo" control (to re-do a previously erased action), a cost information panel, and a product design information panel 308. While the product design information may be provided in any desired manner without departing from this invention, in this illustrated example, the product design information panel 308 provides information about the various portions of the article of footwear being designed, such as color information, size information, material information, personalization message information (e.g., content, size, location, color, etc.), logo information (e.g., size, location, color, etc.), etc.

Other features and functionality may be provided in the customization interface, if desired, without departing from this invention. The following features and functionality may be provided in some manner via the interface: the ability to directly return to a previously viewed website, the ability to save the design, the ability to print the design, the ability to store this design at a location for sharing with others (which may launch an interface that allows one to identify specific persons, classes of persons, or groups (public or private) with whom the design may be shared), the ability to "return to the default" design (e.g., to the blank product on which the customization process was initiated for this product or some other intermediate default design (optionally selected and stored by the user), and the ability to exit or quit the session.

As an additional potential feature, systems, methods, and computer interfaces in accordance with at least some examples of this invention may allow the user to get "inspiration" or "on-line help" during the design or customization process. While any desired information may be provided in response to user interaction with this portion of the interface, in some examples, the systems, methods, and computer interfaces may display to the user information such as: a display of one or more other user designs of the same product (or a selected portion of the product); a display of one or more other user designs of a product (or a selected portion of a product) having the same or similar uses, characteristics, or functions; a display of one or more other user designs by users with similar tastes or interests (e.g., same favorite sports team, same favorite recreational activities, etc.); users from the same geographical region; users from the same age group; users from the same profession; etc.); suggestions for different colors or color combinations that might match well with existing portions of the design (e.g., complementary colors); information regarding popular colors or color combinations for one or more portions of the design (e.g., from previously designed products or inventory); and/or any other desired information (including information relating to the specific product or product line or other interesting designs or inspiring information). This interface also may include functionality to allow the user to immediately purchase the customized shoe at any time during the design process.

Another feature that may be included in the computer interface is a "last action" capability, which allows users to view the last several steps in the design session (and possibly scroll to see all steps in the design session), more details regarding the individually displayed step (e.g., more specifics about the logo color, position, size, or orientation selections, etc.), or the like. The "last action" tool may allow users to select any desired individual step for further action, such as an "undo" action (to undo that step), a "view" change action (e.g., to cause the interface to highlight the change made at that step in the users' views), a reselection action (e.g., to cause the interface to reselect the same part for further action), etc.

Changes to various selected portions of the shoe design may be made in any desired manner without departing from this invention. For example, a user might first use the pointer to "select" some specific part of the shoe (e.g., the heel reinforcement part, a visible portion of the midsole, a portion of the outsole, the tongue, eyelets, laces, toe cap, tread elements, etc.). Interface elements also could be provided to allow user selection of and changes to parts of the article of footwear that may not be visible, such as fluid-filled bladders, plates in the sole, etc. Once selected, the user can make changes to that element. For example, to change color of a part of the shoe, first the user may move the pointer over the depiction of the desired part in the display portion and "click" a mouse button (or other input device) to "select" that part. This selection action may cause the interface to highlight the part in some manner, such as by enlarging it, coloring it differently, or by bolding the external boundary of it. Then, with the part highlighted, the pointer may be moved to select a color from the color palette (e.g., from a color display chart, from preselected color tiles or elements available for that part, from a menu, etc.). When the new color is selected (e.g., by the user again clicking the mouse button or otherwise entering selection input), the systems, methods, and user interfaces according to this invention may immediately change the color of that part on the user's screen. In addition to color changes for the various parts, users could select various other features for customization, such as tread designs, midsole thickness, outsole thickness, midsole window sizes and/or locations (which may allow a view of internal structures of the midsole, such as a fluid-filled bladder, etc.), number of eyelet pairs, etc. Any desired structural, design, or other changes may be made to the shoe design in this general manner without departing from this invention.

Another example feature of systems, methods, and computer interfaces in accordance with at least some examples of this invention relates to a "cost" or "pricing" box. This element of the user interface tracks the cost of the article of footwear in its present design state. As one or more features of the shoe are designed or changed, this may cause the cost of the shoe to change somewhat (e.g., if more expensive materials are used, if a large amount of personalization or customization is requested, if additional production steps or different production techniques are required, etc.). The interface may maintain a price display so that the user can be aware of which changes to the design have caused a shift in price, and the user may be better able to control the final price of the product.

Another potential feature that may be included in systems, methods, and computer interfaces in accordance with at least some examples of this invention includes a "cost variations" icon (although other interface elements may be used to activate this functionality). User selection of this interface element may provide users with information and an opportunity to change various features of the designed shoe to either increase or decrease its costs (optionally, with little or no performance change, although any anticipated effect on performance may be displayed for the user to consider (e.g., "less breathability," "more stiff feel," etc.). For example, interaction with this interface element may provide shoe "upgrade" information, which could advise the user of various potential "upgrade" features available, the performance changes (if any), and the costs associated with making such an upgrade. As a more specific example, a change in material for some portion(s) of the upper or sole structure may make the shoe more comfortable, more stable, and/or otherwise affect its performance characteristics. As another example, the interface may advise the user of the costs associated with adding another design element or feature to the shoe (e.g., adding an additional personalized message, adding a picture or graphic, etc.) or changing an existing design element or feature (e.g., changing sizes of various design elements or personalization elements, changing materials, etc.). The cost change associated with eliminating a design element or feature also may be provided. Systems, methods, and computer interfaces according to the invention may display a list of various options to the user with the cost differential associated therewith, or in some other manner make this type of cost variation information available to the user.

Various additional potential features and functionality may be included in systems, methods, and user interfaces in accordance with at least some examples of this invention. For example, a personalized message may be placed on the lateral side of the shoe in lieu of the usual location of the manufacturer's logo. Users can launch this "personalized message" feature in any desired manner, such as via a toolbar menu item by interacting with an "add message" icon (e.g., by selecting the "add message" icon using a pointer device). Interaction with this icon may cause a text insertion box to pop up, and the user may be able to type or write in any desired message using that insertion box (optionally, the available message length may be limited based on available space at the desired location for the message). The user selecting the icon also could select other features of the message such as font, size, location, orientation, line breaks, etc. If desired, systems, methods, and user interfaces in accordance with examples of this invention also may allow the user to drag the message around (e.g., using the pointer device) to aid in positioning or orienting the message with respect to the shoe structure. The personalized message may be applied to any desired portion of the shoe structure being designed, such as the upper, the midsole, the outsole, the interior bootie, the tongue element (top side or underside), etc., and even to multiple parts of the shoe, if desired.

In a similar fashion to the text message described above, a graphic element may be placed on the shoe structure, such as a picture, graph, icon, avatar, clip art, or other graphic element. Users can launch this "graphics insertion" feature in any desired manner, such as via a toolbar menu item or by interacting with an "add graphic" icon. Interaction with the "add graphic" icon may cause a graphic file selection box to pop up, and the user may be able to choose a saved file corresponding to the desired graphic for insertion into the shoe structure using that selection box. The user selecting the icon also could select other features of the graphic such as size, location, orientation, etc. If desired, systems, methods, and user interfaces in accordance with examples of this invention also may allow the user to drag the graphic around (e.g., using a pointer device) to aid in positioning or orienting the graphic with respect to the shoe structure. The graphic may be applied to any desired portion of the shoe structure being designed, such as the upper, the midsole, the outsole, the interior bootie, the tongue element (top side or underside), etc., and even to multiple parts of the shoe, if desired.

Figure 4:
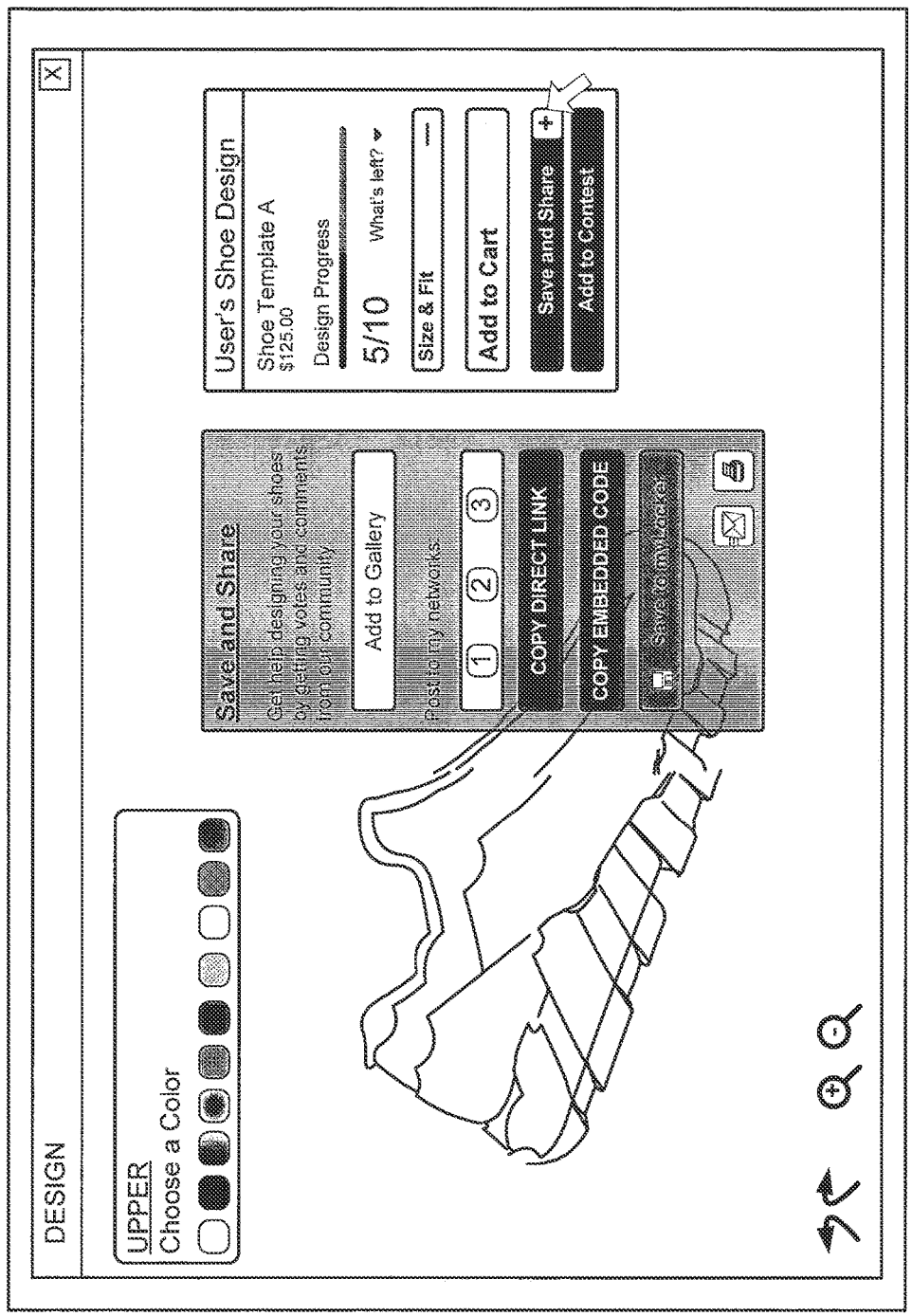
FIG. 4 illustrates an example user interface screen with the save and share feature activated in accordance with aspects of this invention.

After a user has completed a design for an article of footwear (or any other article of interest), the user may select various features from the design website including purchasing the custom designed footwear, adding the custom design to a contest, and selecting the "save and share" tool. Users may enter their custom design into contests offered by various entities, such as the manufacturer of the footwear or product, the entity maintaining the custom design website (which may be the manufacturer), and/or any third party. FIG. 4 illustrates an "add to contest" icon that would permit the user to enter the custom design into such a contest.

The user may select the "save and share" tool from the design website, which may launch a new webpage or website or an overlay screen portion or text box that presents various options to the user, as illustrated in FIG. 4. The "save and share" tool may be launched by selecting the "save and share" icon illustrated in FIG. 4. Selection of the "save and share" icon may cause the "save and share" overlay screen to appear on the computer interface. The "save and share" overlay screen may provide the user with one or more selections relating to the electronic storage and sharing of the custom-designed footwear that the user just created. The "save and share" overlay screen may launch a new webpage or website (e.g., a webpage maintained by the same entity that maintains the custom design tool) or may cause another overlay screen to launch on the same webpage in order to complete the electronic storage and/or the sharing aspects of the "save and share" tool. Alternatively, the "save and share" overlay screen may simply cause the user's new design to be electronically stored or "saved" into a computer memory without additional screens or information. The new design may be stored on computer memory residing in the local computing device operated by the user, the remote computing system operated by the entity maintaining the custom design website, or any other suitable computing storage device.

The "save and share" overlay screen may present various options for the user including, but not limited to a "get help" option, a "gallery" option, a posting option, a save feature, an e-mail feature, and a print feature. Any desired feature that relates to storing or sharing the custom design may be included in the "save and share" overlay screen. The users may wish to store the design for any purpose, such as working on it at a later time, thinking about the design before purchasing it, and the like. Users may wish to share their designs with others for purposes of obtaining feedback about the design, presenting the design to a friend, and the like.

For example, the user may select the "add to gallery" icon that is illustrated in FIG. 4. Such an option would permit the user to store the electronic version of the user's custom-designed article of footwear in a memory that is accessible by a plurality of users. Specifically, the entity maintaining the custom-design website would likely store the electronic file of the custom-designed article of footwear in a memory on its server. The memory may serve as the "gallery" in this example arrangement. The gallery may be accessible by one or more users. In some examples, the gallery may be accessible by any users, i.e., a completely "public" gallery. In other examples, users must register with the entity to gain access to view the designs stored in the gallery. Users may be able to mark their designs "public" or "private" or otherwise restrict access to view the custom designs in any suitable manner.

Designs stored in the gallery may be acted upon or viewed by other users in any suitable fashion. Users may provide feedback on the custom designs and/or may rank, score, or otherwise critique the custom designs. Users may be required to register with the entity maintaining the custom design website in order to provide such feedback or comments.

Users may also be able to vote for designs based on a variety of criteria, such as favorite colors, best design, most comfortable, etc. Any criteria may be used to judge the designs. Designs that "win" a vote for a particular category may be afforded prizes, accolades, free or discounted products, access to various events, and the like. Any type of reward may be given to a user for creating a winning design.

The user's custom designs also may be posted to a social networking website. A user having an account or the ability to utilize a social networking website may be able to "post" a design on the social networking website. Many social networking websites have a user profile webpage that allows the user to post personal items for viewing by other users. The users may wish to display their designs on their user profile webpages offered by the social networking websites. Such social networking websites may be maintained by the same entity that maintains the custom design website, such as the manufacturer of the products, or they may be maintained by a third party, such as Facebook®, Twitter®, MySpace®, and the like. Users may also wish to post their design(s) on a personal website or on another web application. The users may be permitted to post their designs in any suitable manner.

For example, the "save and share" overlay screen illustrated in FIG. 4 offers the users the ability to post their design on three different networks. Users have the option to accomplish a "post" by directly copying the link to the webpage storing the custom design on the server of the entity maintaining the custom design website. This would be similar to sending a "link" to another person or otherwise posting the "link" on a website or within an e-mail, text or multi-media messages, or another electronic message. The link directs the user receiving such a message to the webpage displaying the design that is saved on the server of the entity maintaining the custom design website.

The users may wish to share their designs with other users having access to the design tool's computing system (and thus its memory) or they may wish to share the design with others by sending them a link to the design (wherein the link is stored on the design tool's server) or an image of the design. The user also may be able to embed the computer code that creates the digital image on the user interface into a message so that the image of the custom design appears on the display of the user receiving the message. For example, if a user sends an email containing the embedded code for the custom design, the receiver of the email would see the image of the custom design within the email itself and would not be required to link to another webpage to view the image. Any suitable form of sending links to or images of the custom design created by the user may be incorporated into the systems and methods according to this invention.

The entity maintaining the custom design website may offer users a portion of memory for storing their custom designs. The memory may be private so that only the user may view the custom designs. The user may store incomplete designs in this memory for development at a later time. The entity maintaining the custom design website may require that users register for this privilege by providing personal information such as name, geographic address, email address, and the like.

The "save and share" overlay screen illustrated in FIG. 4 also includes icons for emailing and printing the custom design. If the user selects the email icon, then an email with the custom design may be generated. The custom design may be included in the email in the form of a link or embedded computer code, as discussed above, or in the form of an "attachment," typical of including electronic documents in email communications.

Figure 5:
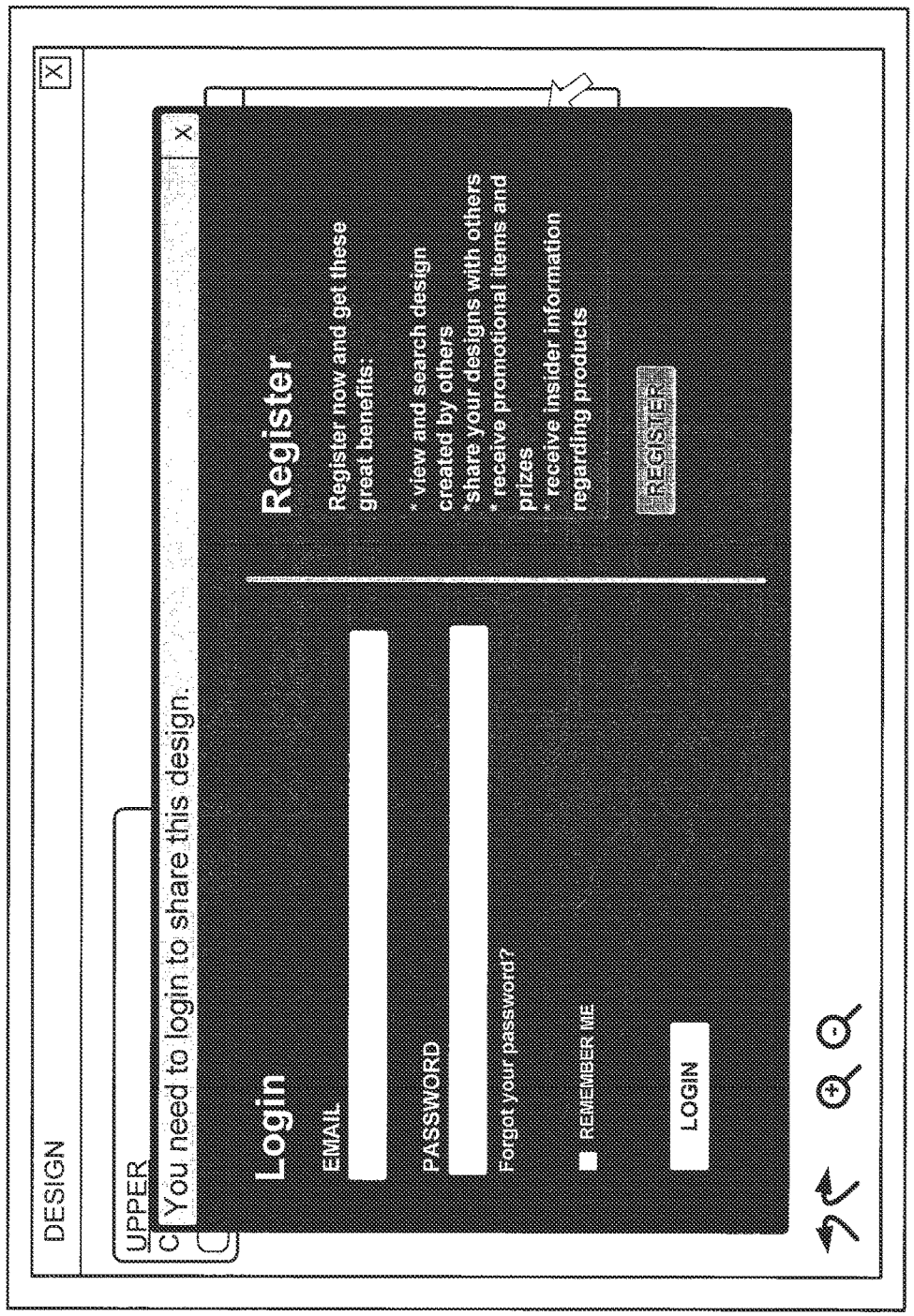
FIG. 5 illustrates an example login user interface screen according to aspects of this invention.
Figure 6:
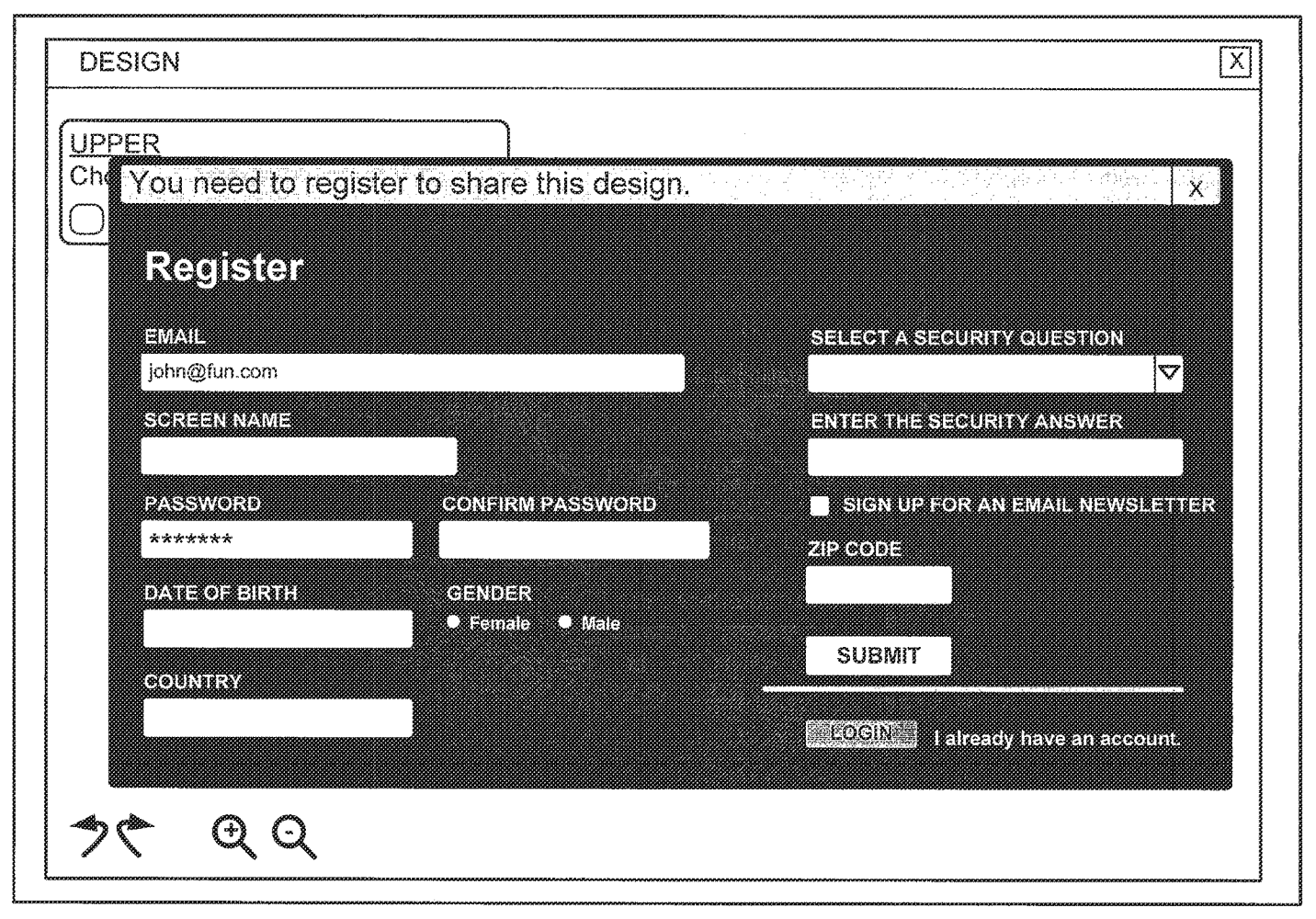

In order to activate the functions available through the "share and save" feature of FIG. 4, users may be required to have a user profile. Users without a profile may be required to register with the entity maintaining the custom design website. For example, FIG. 5 illustrates a login screen overlay that may appear when a user attempts to share a custom design. Users that already have existing user profiles may enter their identifying information, such as their email address and password, as shown in FIG. 5. Users that do not have an existing profile may be required to register with the system. FIG. 6 illustrates an example registration screen overlay that may prompt a user for registration information such as email address, screen name, password, date of birth, country of residence, gender, security questions and answers, and the like. Any suitable information may be required for registration.

In some circumstances users are not required to register with the system to save and/or share their custom designs. The entity maintaining the custom design website may offer incentives to a user to register a user profile, such as, but not limited to, permission to view and search custom designs created by other users, share custom designs created by the user, receive promotional items and prizes, receive insider information about products and events, and the like. Any such incentives may be provided for those users who register with the custom design website.

Figure 7:
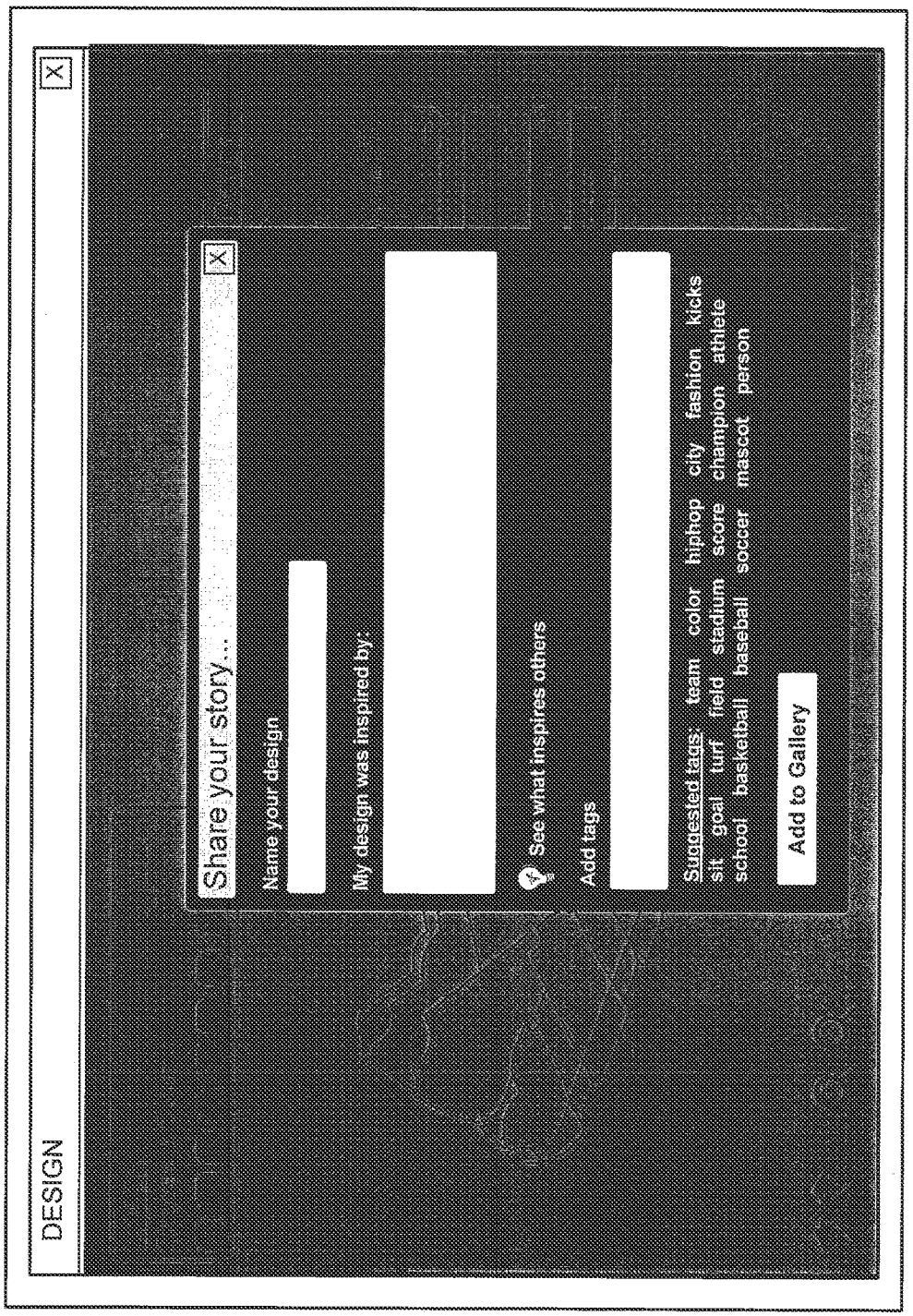
FIGS. 7 and 8 illustrate example user interface screens relating to a share your story functionality in accordance with aspects of this invention.
Figure 8:
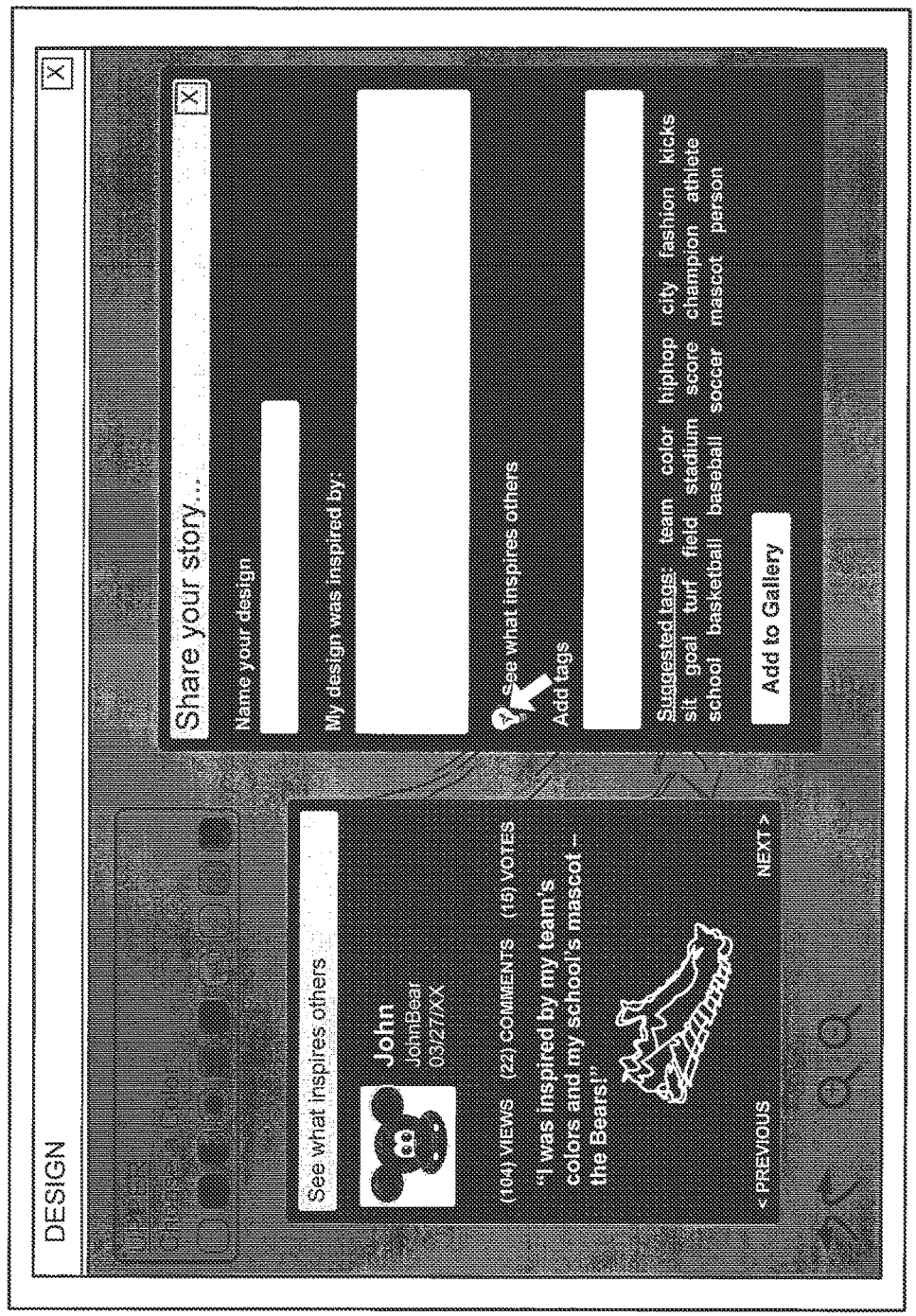

An aspect of the "save and share" tool may permit users to share the story behind their design with other users. As illustrated in FIGS. 7 and 8, a "share your story" overlay screen may appear when users select the option to share the story of their designs. The user may be permitted to name the custom design and provide description about the inspiration of the custom design. The inspiration may be a story written by the user to describe the manner in which the idea occurred to the user to create the custom design. The name of the design and the description of the design's inspiration may be filtered for appropriate content.

Users may also wish to view the inspirations of other users during their design process. A user may wish to view the inspirations that other users have created. The user may select the "see what inspires others" icon from the "share your story" overlay screen. A second overlay screen may appear entitled, "see what inspires others," as illustrated in FIG. 8. The "see what inspires others" overlay screen may include entries created by other users relating to the inspiration(s) for their custom designs. Such an inspiration may include, but is not limited to information such as a photograph of or other image representing the user that created the inspiration, the user's name, the user's screen name, the date on which the custom design was created, any text associated with the inspiration (e.g., a story that describes how the user developed the design or what experiences or things helped to inspire the design), a photograph or other image of the custom design, and the like. If the custom design and/or the inspiration have been viewed or another user has commented on or voted for the design or inspiration, then the results of such views, comments, and votes may be posted on the "see what inspires others" overlay screen as well. Any suitable information may be included in the user's inspiration of the custom design.

Sometimes, multiple users may have contributed their inspirations for their custom designs or a single user may have submitted multiple inspirations for various custom design(s). Users may be able to browse the plurality of custom designs and inspirations. For example, a scrolling tool, such as the "previous" and "next" icons illustrated in FIG. 8, may appear on the "see what inspires others" screen overlay (or any other interface, such as another webpage or website), that permits a user to scroll through the inspirations created by others.

The custom designs and inspirations for the custom designs may be searchable. A user may wish to search for custom-designs that were inspired by a particular team, a famous athlete, a mascot, a sport, an event, and the like. Further, users may wish to search for custom designs that were created within a certain time period (e.g., during the last month, last year, or last week) or created by users living in a particular city or region of the country. Any search criteria may be used.

To facilitate searching, "tags" may be associated with a custom design or an inspiration for a custom design when it is created. Tags are parameters or system metrics that associate a keyword or phrase with a particular design. Such keywords and phrases are useful for later searching of designs. Either the user or the system will assign a tag to the custom design or the inspiration of the custom design. When the user wishes to create the inspiration for a custom design, the system may prompt the user to enter tags. The user may be prompted in any manner to select tags associated with the custom design. One such manner in which the user may be prompted to select tags for the custom design is illustrated in FIGS. 7 and 8. Within the "share your story" overlay screen, the user is prompted to enter information about tags in the "add tags" window. Users may enter their own words as tags or may select from a group of suggested tag words. Users may be restricted from using profanity or other inappropriate words or combinations thereof via a filtering system used with the overall system design. Any restrictions may be placed upon the entry of the tag words.

The suggested tag words may be any topic or category that might be descriptive of the custom design. For example, words such as team, color, hiphop, city, fashion, kicks, goal, turf, field, stadium, score, champion, athlete, school basketball, baseball soccer mascot, and person may be suggested words for the user. Certain events such as "March Madness" or holidays may be used as tags to describe a design or inspiration. Further interests such as hobbies, community groups, and the like may be used as a tag.

As described above, any entity or user may be able to assign a tag to a custom design and/or an inspiration for a custom design. A user may assign tags to the design or inspiration during creation of the design or inspiration at any time during the design process. In a similar manner, the system itself may automatically or manually assign tag(s) to a design or inspiration. For example, the system may assign a metric identification number to all custom designs and inspirations. The system may also assign tags to the custom design or inspiration according to other aspects of the design or inspiration such as, but not limited to, the language that the user used to create the design or inspiration, the design's creation date and/or publication date, the products name, type, and category, the gender of the user, the user's name, the user's age, the colors that the user selected for various portions of the product or footwear, the geographical location or region in which the user resides, whether the design or inspiration has been marked private or public, the manufacturer's name for the product, the user's hobbies or interests, and any other suitable attribute of the user and/or the design.

Other users or third parties also may be able to assign a tag to a user's custom design or inspiration. For example, a user viewing an inspiration may realize that the inspiration mentions a particular sports team. The existing tags may not mention the sports team. The user may be able to assign the sports team tag to the inspiration or may send a suggestion to the user who created the inspiration or the computing system that the sports team tag should be assigned to the inspiration. The users that created the inspiration or the system may have the ability to refuse to allow a suggested tag to be assigned to the custom design or the inspiration. The creating user, other users and third parties, and the system may have the ability to add and/or revise tags relating to a custom design or an inspiration at any time throughout and after the design process.

The tags assigned to the custom designs and the inspirations may be used as search terms. For example, users may be able to search the custom designs and inspirations based on any kind of criteria such as the information about the user that created the design, the design characteristics and date on which it was created, the tags assigned the custom design and/or inspiration by the user, the tags assigned the custom design and/or inspiration by the system or a third party, and any other criteria that may be associated with the custom design and/or inspiration. Any data collected about the user, the custom design, and/or the inspiration may be used as a tag so that the criteria may be searchable.

The tags represent a keyword or term assigned to the electronic information that represents the custom design or the inspiration. The tag may represent a type of metadata that is associated with the custom design or inspiration's electronic file so that the file may be found again via searching, browsing, and/or filtering.

When users view the custom designs and inspirations, they may choose to provide a comment on them and/or vote for one or more of them. Users may choose to provide constructive feedback or other comments on one or more custom designs and/or inspirations. Further, votes may be entered for a custom design or inspiration to reflect a user's choice for best design, most attractive design, most comfortable design, or any other criteria on which a vote may be based. The number of times a custom design or inspiration is viewed by another user may also be tracked and tallied. The tally of the number of times the custom design or inspiration has been viewed, or provided a comment or voted upon may be posted and viewed in the "see what inspires others" screen overlay.

Users may search for designs and inspirations in any suitable fashion and based on any data that is collected about the design, the user, and/or the inspiration. The results may be generated based on the relevancy of the tag to the search criteria. Users may also search based on the most popular designs by number of votes or number of times others have viewed the designs (or any other popularity criteria).

Any of the search criteria or tags that are described above may be used to establish a platform to create feedback about the results. The feedback may be visual, audio, or a combination thereof. In some examples, the feedback may be a map, chart, graph or other document or image depicting the results for a particular search criteria or tag information. For example, a user may wish to view the geographic locations where the users reside that have submitted custom designs. To depict such a result, a map of the country (or any other geographic area) may appear that illustrates the number of users having submitted custom designs from any given geographic location on the map. Likewise, a user may wish to view the gender of the users that have submitted custom designs. The results of this request may be a man and a woman with respective numbers near each that represents the number (or percentage of the whole) of designs submitted by each respective gender. Such visualization of the search results or criteria may take any form and can be based on any criteria, tag, or other information relating to the custom design and/or the inspiration. The visualization can also be based on any combination of tags, assigned metrics or other criteria. For example, the system could create a map showing all designs relating to skateboarding in California. Similarly, the system could create a map of all designs relating to BMX biking in the southeastern portion of the United States. Other visualizations could be created for other tags such as designs relating to running shoes submitted by females in a certain age group. Other criteria could also be used.

The custom designs created by users may be used in a variety of manners. For example, an electronic file containing the image of the custom design may be saved for personal use by the user that created it or may be available for use by other users. Such a file may be used as a desktop background or screen saver for a computing device. The file also may be uploaded to another website for use in another application. Any suitable use for the image may be offered.

Some of the custom designs may be afforded a special status or prize. Some designs may win prizes for originality or any other feature. Other designs may be voted on by the community of users to determine which custom design is the favorite amongst the community. The selected design may win prizes, entry to events, chances to meet a celebrity or famous athlete, or the custom-designed footwear may be manufactured and sold.

The above examples are described in terms of a single user engaging in a design of an article, such as footwear. Additional examples would include collaborative design of articles between two or more users. Such collaborative design functionality is described in U.S. patent application Ser. No. 12/470,338, filed on May 21, 2009, which is incorporated by reference herein in its entirety. All of the features relating to the design of articles discussed in this application may be utilized in systems and methods in which multiple users are engaging in on-line design, such as collaborative design.

Those skilled in the art will readily appreciate that the systems, methods, and/or computer interface features described above in conjunction with design and/or shopping for articles of footwear also may be used and/or practiced in conjunction with designing other products, such as apparel (including athletic apparel, uniforms, etc.) and athletic equipment (such as balls, bats, gloves, bags, protective equipment, team gear, pads, hockey sticks, watches, socks, etc.).

III. Specific Examples of Design Systems and Methods Embodied in a Mobile Device Application According to Examples of this Invention The custom design systems and methods described above may be implemented in various mobile computing devices, such as mobile telephones, smart phones, and other mobile devices. Some mobile computing devices may have access to the Internet through a Wi-Fi connection or through the cellular network via a gateway computer. Such mobile computing devices are capable of accessing websites, such as the custom product design websites described above. Still other mobile computing devices are capable of running a software application on the mobile computing device so that the user may be able to directly interact with the custom design functionality. For example, entities that maintain websites on the Internet may create software applications for use on individual (or groups of) mobile computing devices, such as a mobile telephone or smartphone like the iPhone® by Apple®. Such a local software application provides the user with direct access to the functionality offered by an entity rather than accessing the website of the entity. These software applications may offer similar if not identical functionality that is offered on their corresponding websites. Further, the software applications may offer additional features to the user that are not available or not practical for the entity's website.

Figure 9:
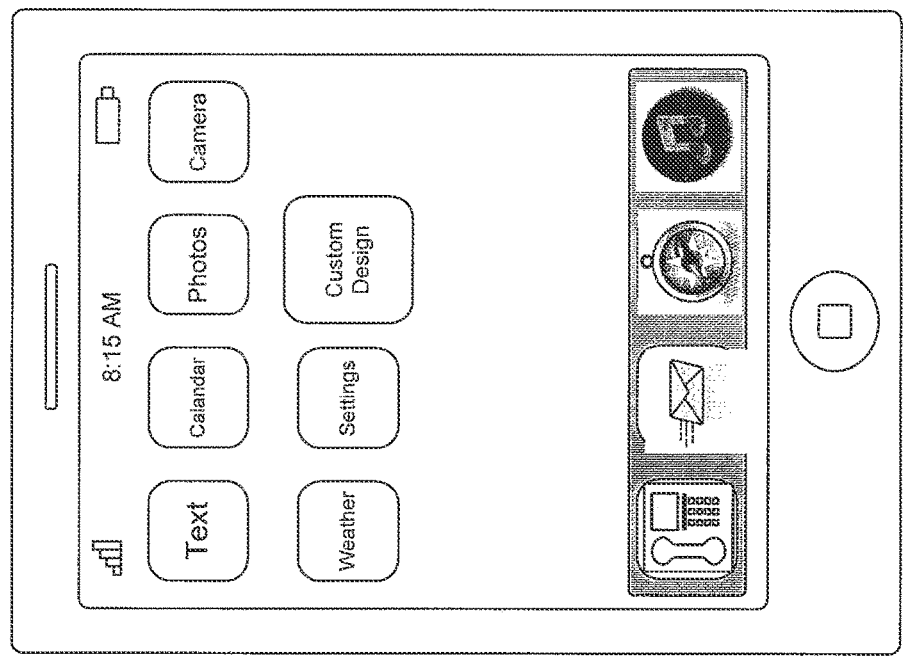
FIG. 9 illustrates an example user interface screen for a mobile device of the product customization functionality application, in accordance with examples of this invention.

An example software application for a mobile computing device may incorporate the custom design systems and methods described above. For example, FIG. 9 illustrates an exemplary user interface screen for a mobile computing device in which one of the software applications stored on the mobile computing device (or available to the mobile computing device via other connection methods) is a software application for custom designing products. The mobile computing device illustrated in FIG. 9 permits the user to select items and input data via touch screen capabilities. However, the mobile computing device may use any other input device available. In FIG. 9, the user may choose to select the "custom design" icon to access the functionality offered by this software application.

Figure 10:
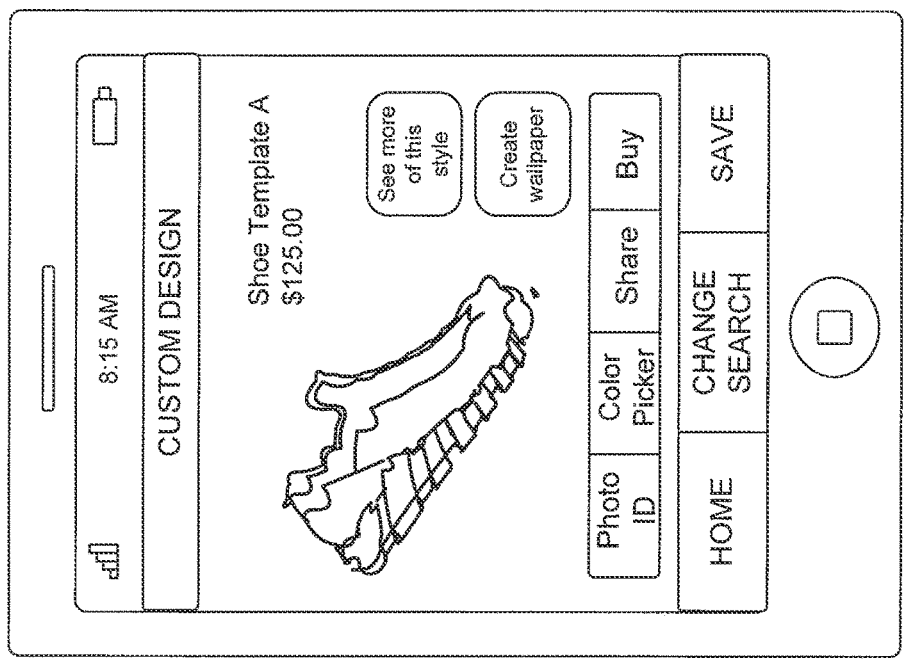
FIG. 10 illustrates an example user interface screen for a mobile device application for the custom design process of the product customization application.

One example feature of the systems and methods for custom designing products via the mobile computing device software application is illustrated is in FIGS. 10-13. In addition to all of the functionality described above relating to the custom design of articles, the mobile device application offers some features that are unique to the mobile device application. FIG. 10 illustrates a user interface screen for the custom design feature. In this example, an article of footwear is being custom designed. The article of footwear is in the style of "Shoe Template A." The user is able to view a clean template of the Shoe Template A on this user interface screen. The user is able to select various portions of the footwear and customize the colors, attributes, textures, appearance, materials, and the like, as described in the systems and methods described above. Specifically in FIG. 10, the user may select a portion of the footwear, such as the upper by touching that portion of the image of the footwear on the display of the mobile computing device. Further, the user may select various colors for each of the portions of the footwear by selecting a color first and then applying it to the desired portion of the footwear or vice versa. The user may design the footwear in any suitable manner and as described in the custom design systems and methods described above. The user also may see additional templates for the same style of footwear by selecting the "see more of this style" icon. The user also may wish to select the image of the footwear as a background or "wallpaper" for the mobile computing device by selecting the "create wallpaper" icon.

Figure 11:
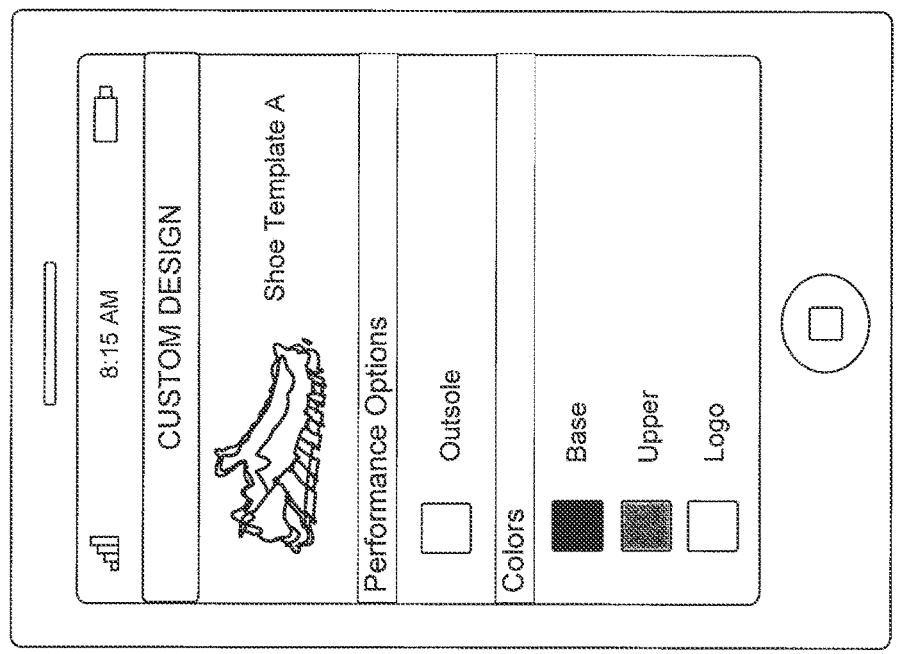
FIG. 11 illustrates an example user interface screen for a mobile device application for another aspect of the custom design process of the product customization application.

FIG. 11 illustrates an example user interface screen in which the user has selected colors for various portions of the footwear, including the base, the upper, and the logo. These selections may be displayed in a list-style format so that the user may quickly view the colors selected for each portion of the footwear. The display of the user's color selections may be displayed in any suitable fashion. The performance option for the outsole was also custom selected by the user in the example footwear illustrated in FIG. 11. Performance options may be selected for any portion of the footwear. Performance options often relate to attributes of the footwear such as hardness, stability, breathability, and the like. Any suitable performance option may be selected by the user.

The user may search for various styles or change a search in the custom design process. The mobile computing device may be equipped to receive various input data from the user. For example, the user may touch the screen to select various options or to input data. The user also may physically shake or "shuffle" the mobile computing device to select an option or enter input. For example, a user may wish to view a particular style of shoe in various colors before purchasing, saving, or sharing the custom designed product. To "scroll" through the style of shoe with various color combinations, the user may physically shake or "shuffle" the mobile computing device. Such a shuffle is sensed by the mobile computing device and the software application is instructed to display another style with a different color combination. This shuffling process may be used to control any feature or input any data into the mobile computing device's custom design software application. The user may also rotate, swipe, tap, or pinch the mobile computing device as a means of inputting data or selecting options within the software application. Any suitable method of inputting data or selecting options within the software application may be implemented.

Figure 12:
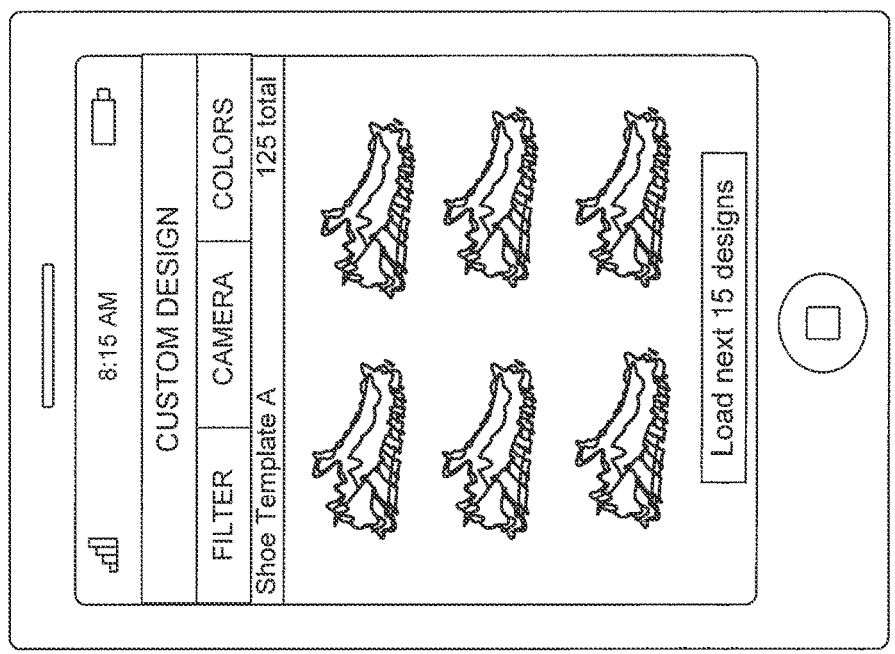
FIG. 12 illustrates an example user interface screen for a mobile device application for yet another aspect of the custom design process of the product customization application.

For example, FIG. 12 illustrates various design options for Shoe Template A. The user may view the results for the styles available for Shoe Template A by scrolling through the results of the search. Once the user has selected a particular style of footwear to custom design, then the user may select the style by touching the screen over the image of the desired style (or by using any other suitable input for the mobile computing device). Once the user has completed the custom design of the footwear (or other product), then the custom design may be saved or stored in memory located on the mobile computing device or another remote computing device or in removable memory.

As discussed above, the user may be able to personalize the product being custom designed. The user may want to place text or images on the products. The software application may permit the user to enter custom text or upload images onto the product, such as the user's name or favorite picture. The product may be personalized in any desired manner, as described in greater detail above.

Figure 13:
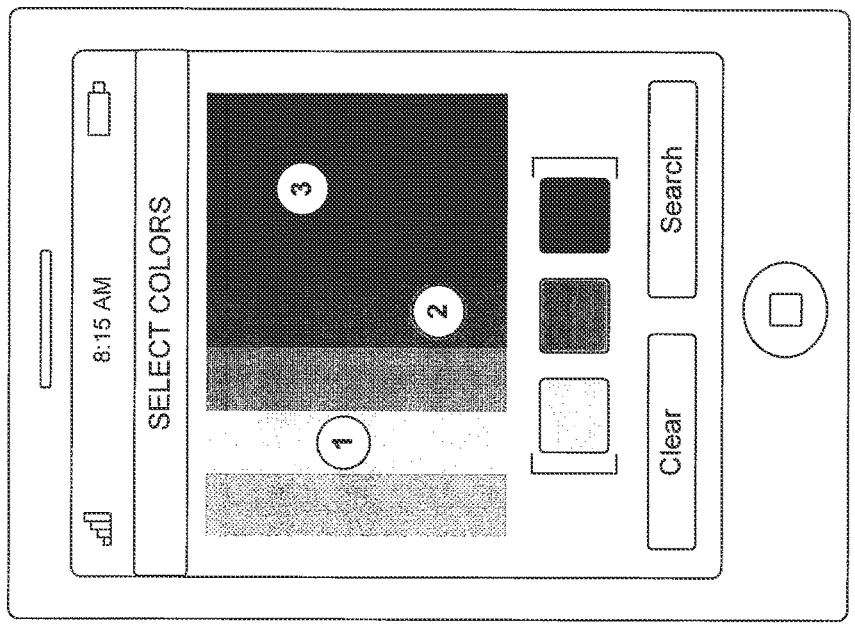
FIG. 13 illustrates an example user interface screen for a mobile device application for selecting a color of various portions of the product being custom designed.
Figure 13:
Figure 13:
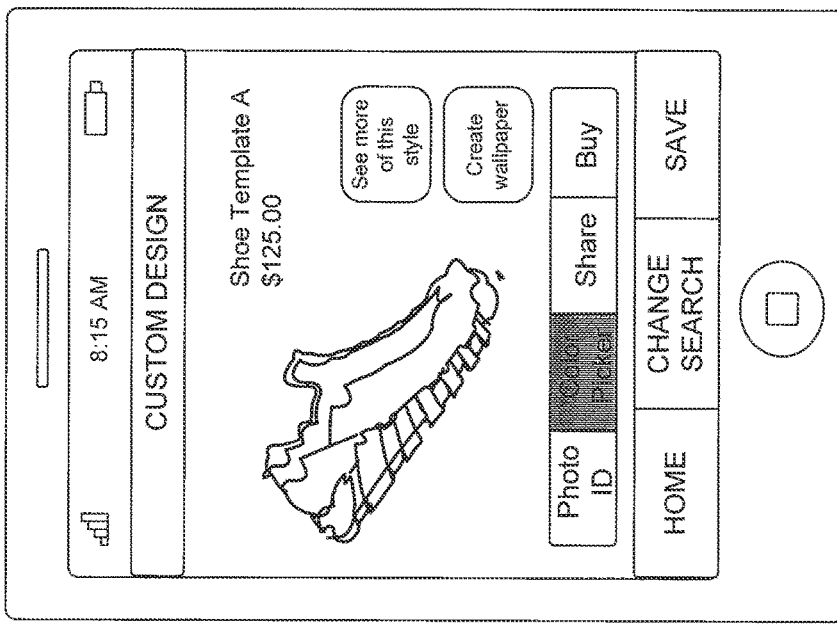

Referring again to FIG. 10, the user may choose colors for the footwear by selecting the "color picker" icon. The color picker feature may function by displaying a user interface screen that permits the user to select a color for a specific portion of the shoe, such as the upper or the sole structure. Additionally, the color picker function may display a color spectrum, as illustrated in FIG. 13. The user may be permitted to select one or more colors from the color spectrum. The user may assign those colors to various portions of the footwear. In another example, the user may simply select one or more colors from the color spectrum and allow the custom design software application to search for styles that include the selected colors. For example, in FIG. 13, the user has selected three colors. Once the user selects the "search" icon, the custom design software application will provide the user with one or more resulting footwear styles that match the user's selected colors. If the user selects red, green, and blue from the color spectrum illustrated in FIG. 13, the custom design software application may identify thirty styles that incorporate red, green, and blue in one or more portions of the article of footwear. Each of these thirty styles may be displayed to the user and the user may be able to browse the results.

Figure 14:
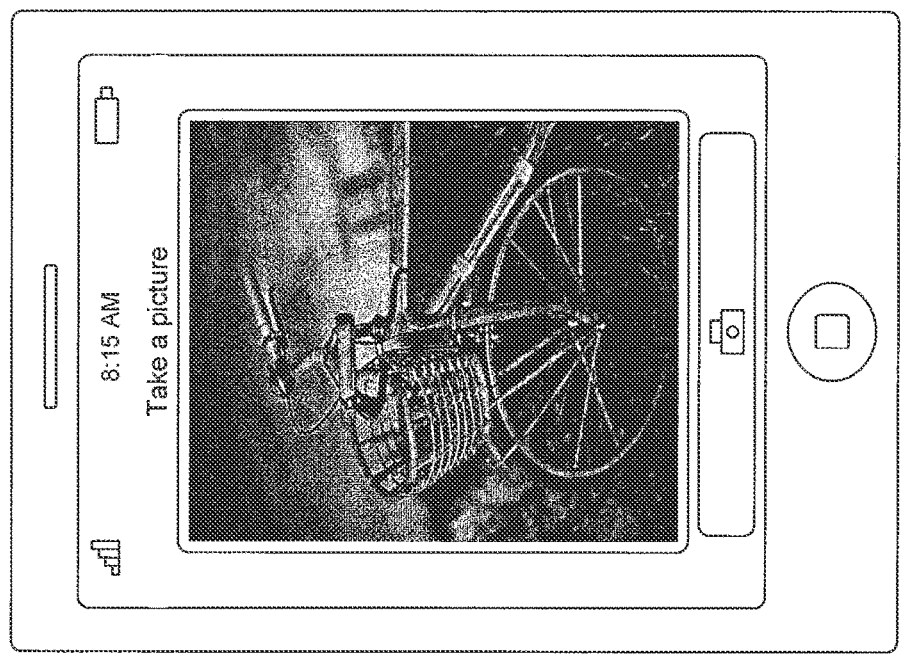
FIG. 14 illustrates an example user interface screen for a mobile device application for taking a photograph of an object that inspires a design for a customized product.
Figure 15:
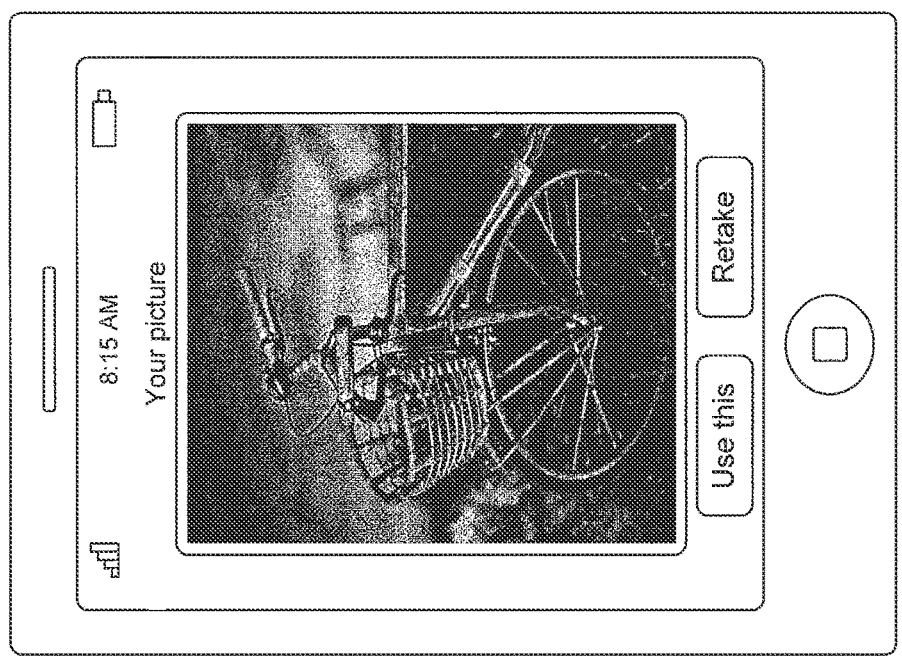
FIG. 15 illustrates an example user interface screen for a mobile device application for determining whether to utilize the photograph illustrated in FIG. 14 for the custom designed product.
Figure 16:
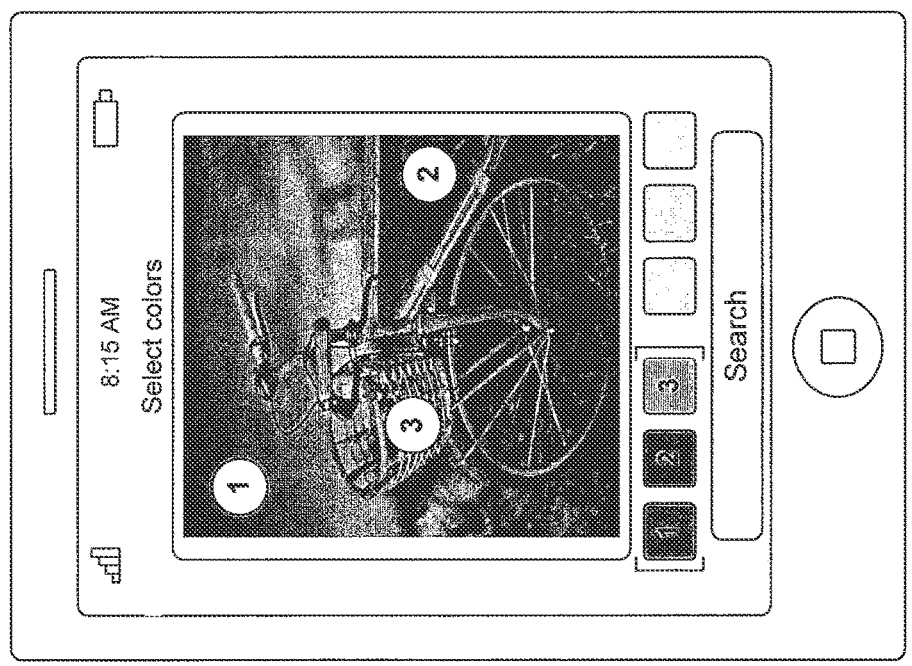
FIG. 16 illustrates an example user interface screen for a mobile device application for determining which colors from the photograph taken in FIG. 14 to utilize for inspiration in the custom designed product.

In FIG. 10, the user may select the "photo ID" icon. The photo ID feature permits the user to take a photograph and use the photograph (or aspects thereof) as inspiration in the custom design of a product. FIGS. 14-18 illustrate examples of a user taking a photograph that inspires the custom design of an article of footwear. FIG. 14 illustrates a user interface screen in which the user has operated the mobile computing device to take a picture of a bicycle for inspiration in custom designing an article of footwear. FIG. 15 is a user interface screen that offers the user the option to either use the photograph of the bicycle or to retake the photograph. In FIG. 16, the user has decided to use the photograph of the bicycle as an inspiration for a custom designed article of footwear. Via the touch screen, the user selected three colors in the photograph for incorporating into the custom designed article of footwear. The user may select any number of colors of the photograph. Various other features of the photograph may also be used to inspire aspects of the footwear, such as materials and stability. In another example, the software application automatically selects colors from the photograph for the custom designed product.

Figure 17:
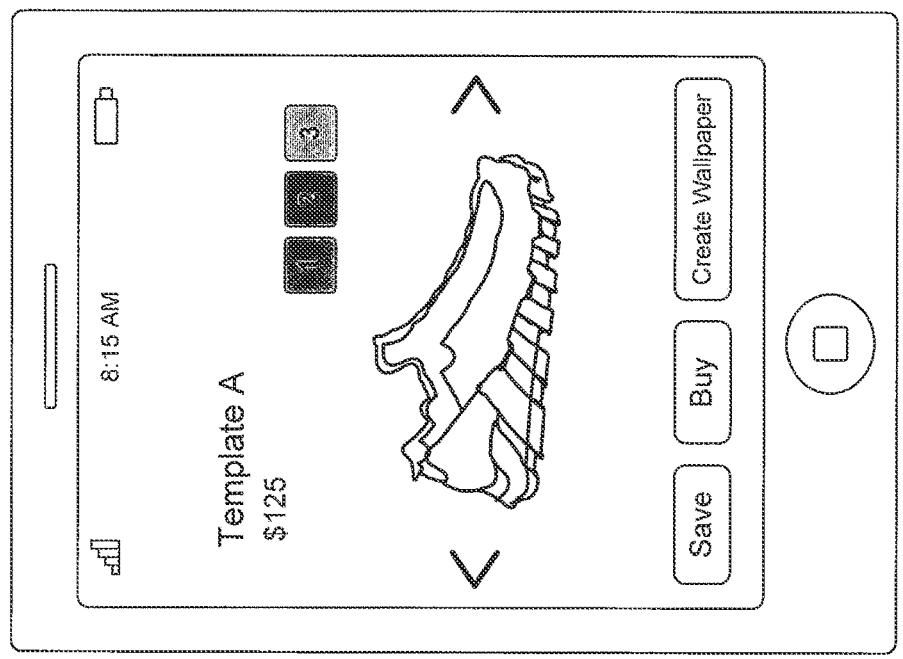
FIG. 17 illustrates an example user interface screen for a mobile device application for viewing the product that is inspired by the colors selected from the photograph, as noted in FIG. 16.

Once the user has selected colors from the photograph, the user may select the search icon that is illustrated in FIG. 16. The search results may display one or more articles of footwear that incorporate the selected colors. FIG. 17 illustrates one of the resulting articles of footwear. The results may include designs created by other users that incorporate the selected colors, designs suggested by the software application itself based on the combination of colors, and any other suitable designs. The user may scroll through the results by selecting the forward and back arrow icons positioned on either side of the resulting article of footwear (or any other suitable browsing method that is offered by the software application). From the user interface screen illustrated in FIG. 17, the user may also purchase the custom designed article of footwear and/or select the custom designed footwear image as the background or "wallpaper" for the mobile computing device.

Figure 18:
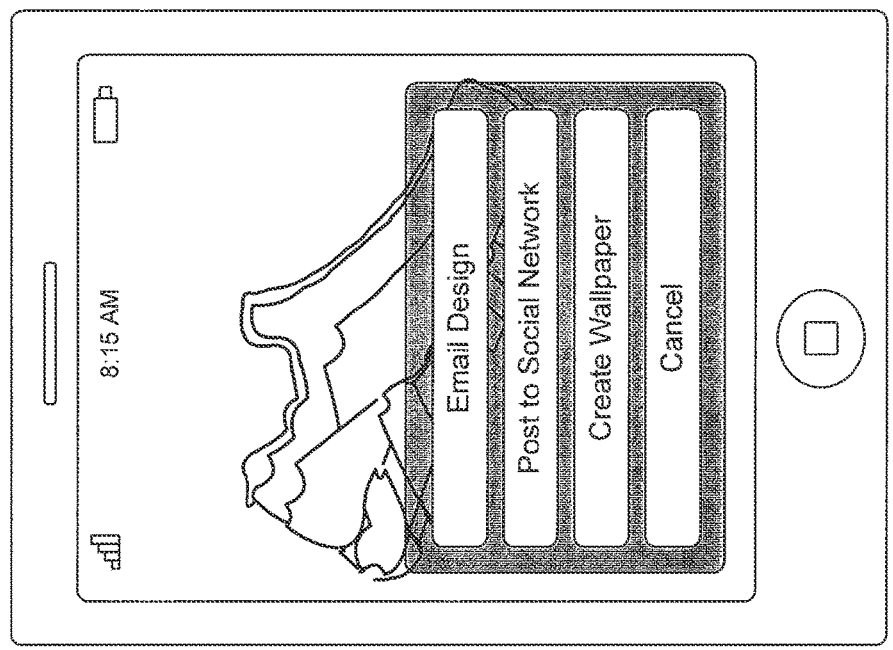
FIG. 18 illustrates an example user interface screen for a mobile device application for sharing a custom designed product with another user.

FIG. 18 illustrates a user interface screen in which the selected custom design may be shared. The user may wish to email the design to another person or user and/or post the design to a social network such as Facebook®, MySpace®, or Twitter®. In this manner, the software application may interface directly with one or more social networks so that the user may "post" or display the image of the custom designed article of footwear directly on the user's corresponding webpage in the social network system.

The user may also utilize any other audio or visual input as inspiration for the custom designed product. A user may record a video or a sound (or series of sounds) that the user wishes to use as inspiration for a custom design. In one example, the user may be on the street of a large metropolitan city and record the sounds of the city or may be in a meadow and record the sounds of birds chirping. The software application may then select various colors and attributes for a product to suggest to the user. In the city audio recording example, the software application may select bold colors, such as a deep red and a royal blue and a strong, stable sole structure. In the meadow recording example, the software application may select yellow, green, and light blue as colors and a light, breathable material for the product. In much the same fashion, the user may input various audio and visual data as inspiration for a custom design, such as video clips. In another aspect of this feature, the software application (or another application on the mobile computing device) may offer a "sketchpad" feature that permits the user to create artwork directly on the mobile computing device. This artwork may be used as inspiration for a custom designed product as well. In yet another aspect of this feature, the user may speak words into a speaker on the mobile computing device that may be used as inspiration for the custom designed product. The user may select words like "blue" and "red" and the software application may generate suggestions based on the spoken colors. Any word or combination thereof may be spoken by the user for inspiration in the custom design of a product.

Figure 19:
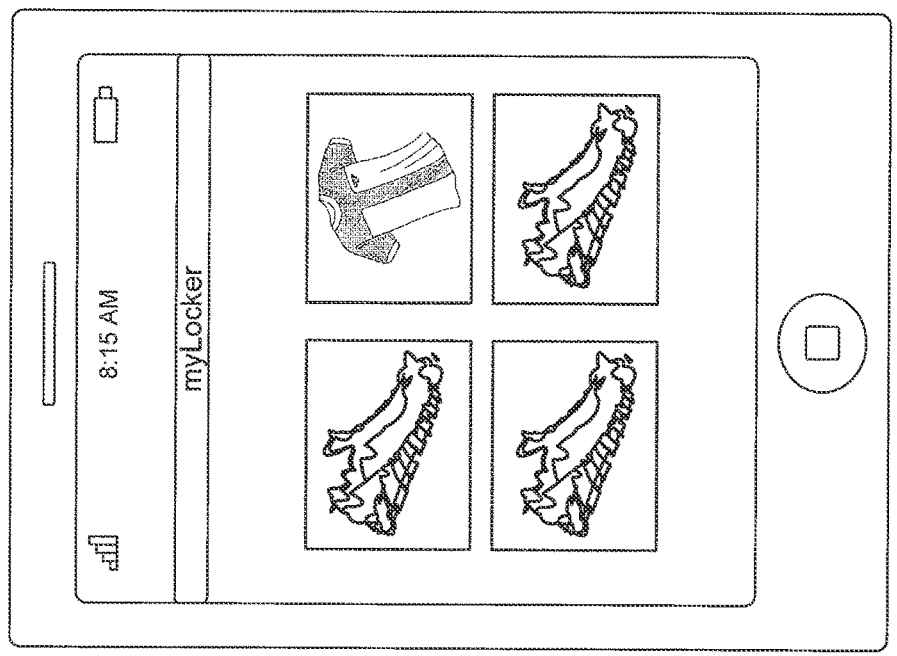
FIG. 19 illustrates an example user interface screen for a mobile device application for viewing the custom designed products that a user has created.
Figure 20:
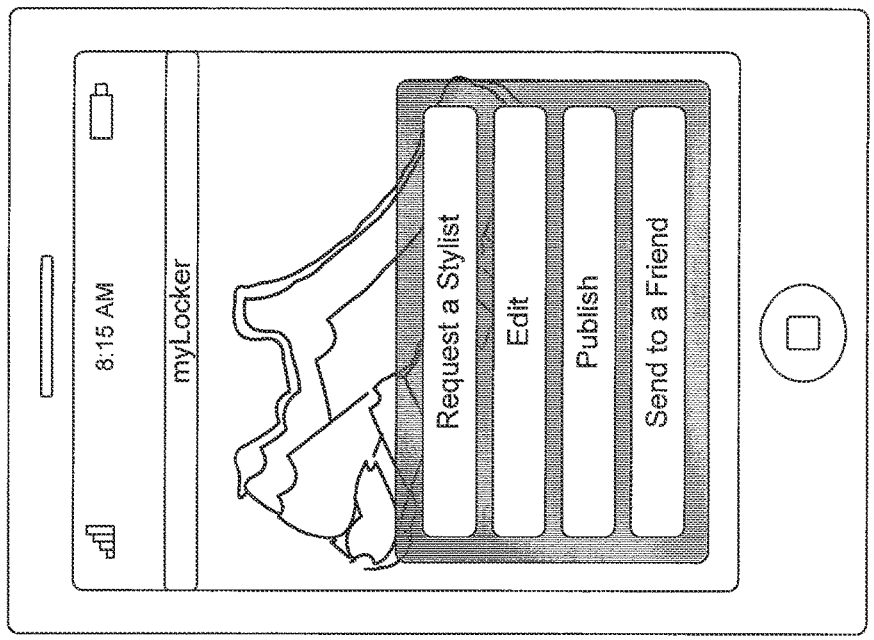
FIG. 20 illustrates an example user interface screen for a mobile device application of sharing with another user one of several of the custom designed products that a user has created, editing the custom designed product, and requesting assistance from another user or stylist for the custom designed product.
Figure 20:
Figure 20:
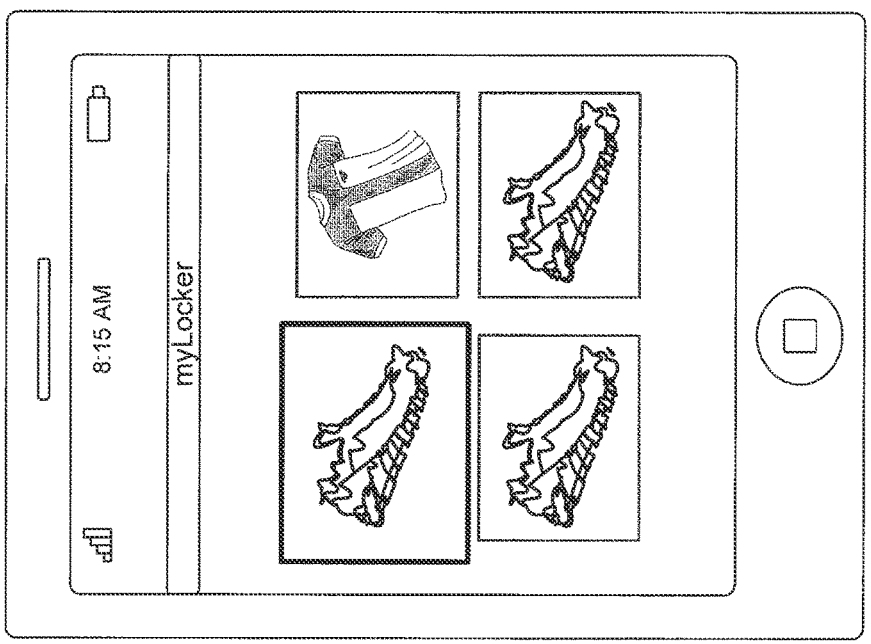
Figure 21:
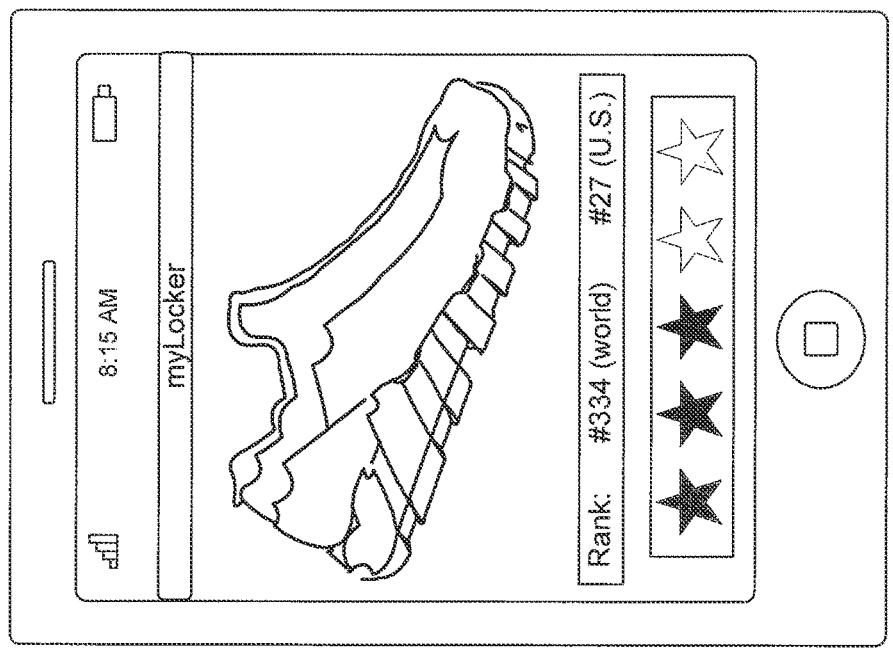
FIG. 21 illustrates an example user interface screen for a mobile device application that assigns a ranking to the user's custom designed product.

The software application may permit the user to store custom designs in memory on the mobile computing devices, in removable memory, or memory in a remote location (i.e., the custom design may be transmitted via the Internet or cellular network to be stored in memory on a remote computing system). In one example the entity may allow a user to register an account and provide such a registered user with a portion of memory for storing data including custom designed products. FIGS. 19-21 illustrate example user interface screens for a registered user who has a portion of memory available to the user for saving custom designed products. User registration is not required, but is often implemented so that users may be easily identified.

FIG. 19 illustrates a user interface screen in which four products that the user has custom designed are displayed. In this example, the user has custom designed three articles of footwear and one article of apparel. FIG. 20 illustrates a user interface screen in which the user has selected one of the articles of footwear from the memory. The selected article of footwear may be displayed on the user interface screen and several options for the article of footwear may be offered to the user. For example, the user may be offered an option to request a stylist by selecting the "request a stylist" icon in FIG. 20. Requesting a stylist may open up communication between the user and a stylist such as a design expert or friend that may help the user in creating the custom designed product or provide feedback and suggestions on an existing design. The stylist may consult with the user in any suitable manner (i.e., via text messaging, video conferencing, email, calling, and the like). The user may also be permitted to edit the custom design of the product by selecting the "edit" icon in FIG. 20.

Additionally, the user may be able to publish the custom design of the product to various locations by selecting the "publish" icon in FIG. 20. The designs may be published to any suitable location such as but not limited to a website (either maintained by the entity offering the custom design capabilities or another entity or individual), a social networking website, or any other publication. The user may publish the custom designed product(s) in any suitable manner. The user may also be able to send the design to a friend by selecting the "send to a friend" icon on the user interface screen in FIG. 20. This feature allows the user to send an image of the design and/or text about the design to any other individual or another user. The user may send such a message by email, texting (short message service) or multimedia messaging, or any other communication method.

FIG. 21 illustrates a user interface screen that is displaying one of the custom designed products that the user created and stored in the available memory, as discussed above. The article of footwear displayed in this screen has been ranked and provided a rating. The ranking may be assigned to the design based on any criteria such as voting by other users or feedback received from publishing the design. The ranking may be for all designs created by users within the United States (or any other country) or throughout the world. The design may also be rated by receiving a score. The rating system may be any suitable format. In FIG. 21, the rating system consists of five stars. The article of footwear displayed in FIG. 21 has received a rating of three stars. The ratings may be generated in any suitable manner and may be assigned to the designs by any suitable entity (i.e., other users, the entity maintaining the custom design website, etc.)

The users may submit designs for contests and competitions. Other users may vote on their favorite designs during the contest or competition. Some of the competitions may be between two users. The competition may be tournament style "battles" in which a user's design advances to another round of the tournament upon winning a battle with another user's design. In another aspect of the rating and ranking system, the designs may be published to a website or another publically available location and other users may be permitted to offer feedback about the design. Further, the other users may be able to vote "yes" or "no" for the design. Good feedback or high scores may earn the user prizes, awards, accolades, or any other recognition.

Figure 22:
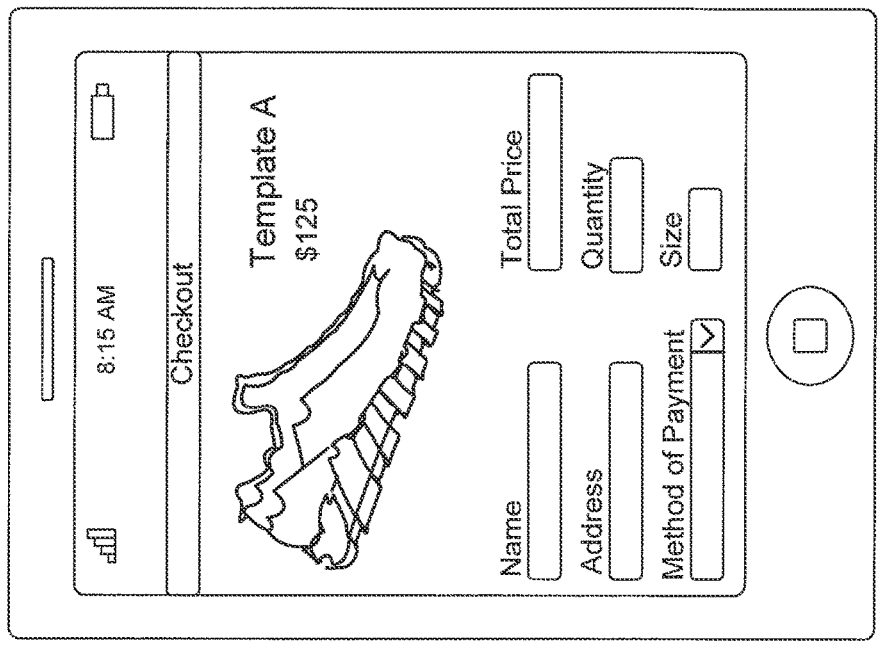
FIG. 22 illustrates an example user interface screen for a mobile device application that allows a user to purchase the custom designed product.
Figure 22:
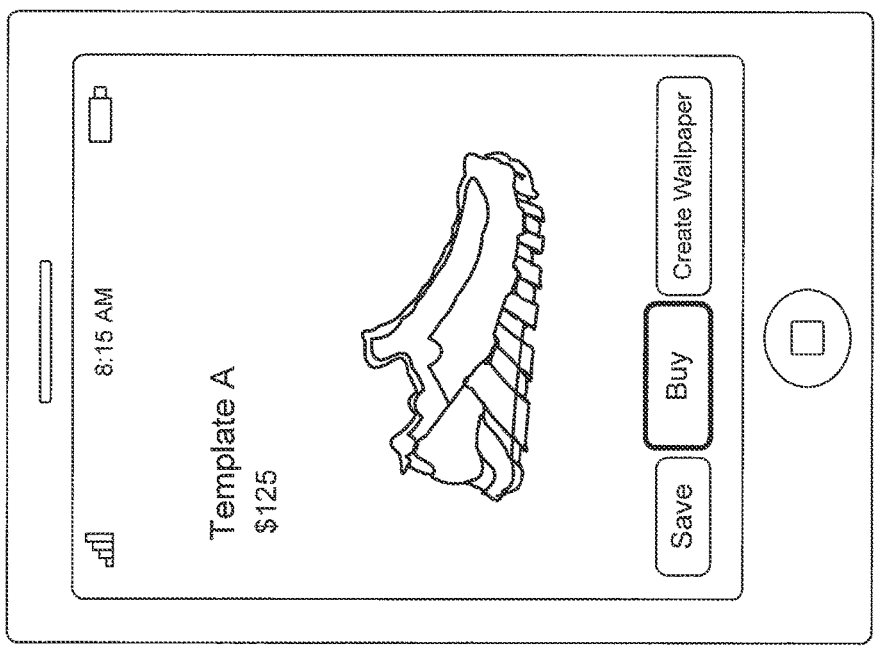

Users may wish to purchase custom designed products that they create and/or that were created by others. The custom design software application for the mobile computing device may permit users to purchase such custom designed products directly through the application (as opposed to being directed to the manufacturer's website and then purchasing the item). As illustrated in FIG. 22, a user may wish to purchase the illustrated custom designed article of footwear by selecting the "buy" icon. The user may be asked for identifying, sizing, and payment information during the purchasing process. Such a direct link to purchase the custom designed products streamlines the purchasing process.

Many exemplary mobile computing devices contain a global positioning system (GPS) receiver that permits GPS satellites to identify the geographic location of the mobile computing device. Oftentimes, users carry the mobile computing device on their person and thus GPS is able to identify the location of the user through this method. The ability to track a user's location is useful in commerce. For example, the user may be offered location-specific information regarding sales and events that are local to the geographic area in which the user is located. FIGS. 23-26 illustrate user interface screens that present various offers or notifications to the user based on the user's location, as detected by GPS. Although specific examples are identified herein, any suitable offer, promotion, discount, notification, alert, or any other feature may be offered to the user based on the user's location. Further, the user's location may be calculated by any means other than GPS. GPS location tracking is a feature that is commonly incorporated into mobile computing devices and thus lends itself well to inclusion in the methods and systems described herein.

Figure 23:
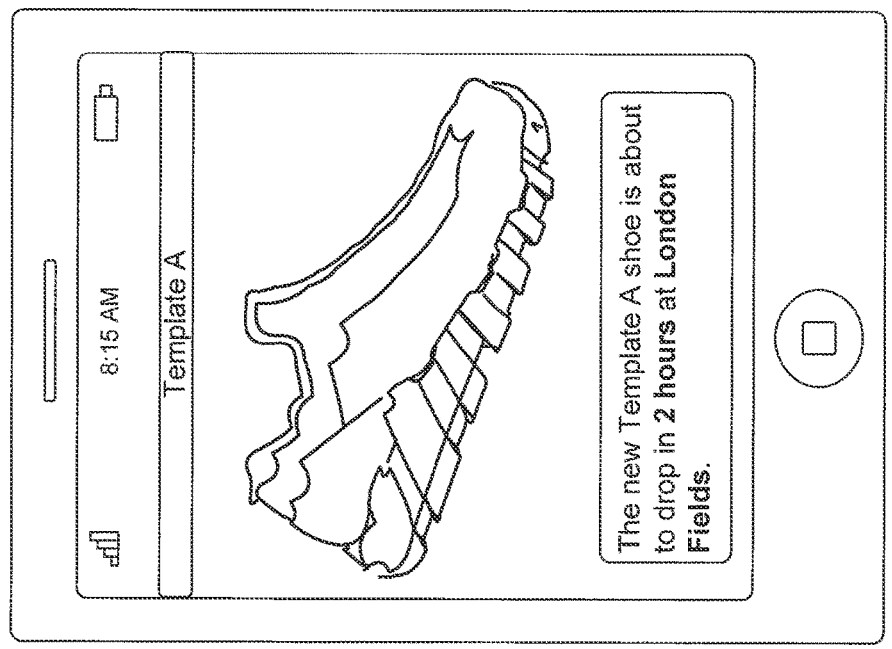
FIG. 23 illustrates an example user interface screen for a mobile device application that notifies a user of an event relating to a product.
Figure 24:
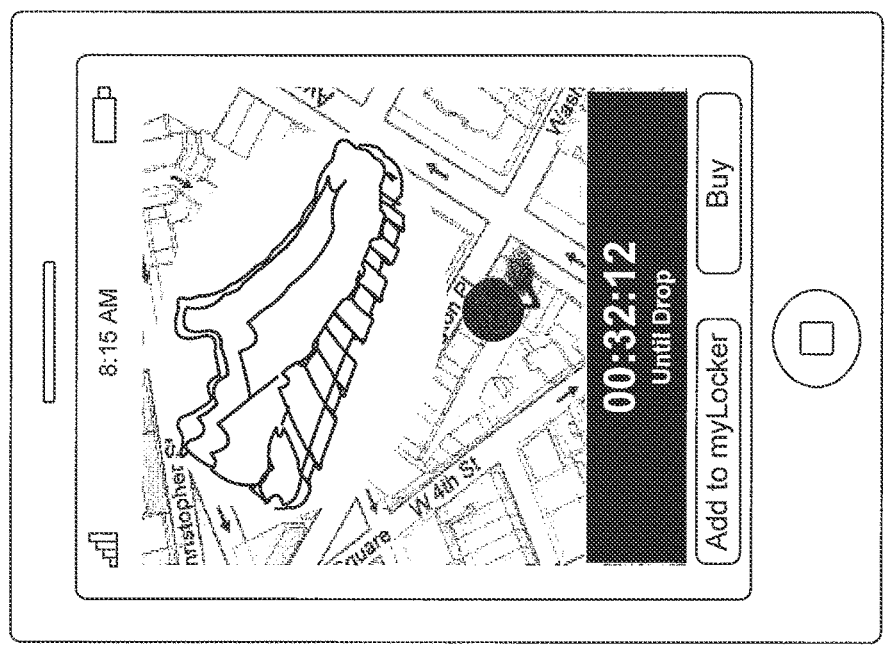
FIG. 24 illustrates an example user interface screen for a mobile device application that identifies a location for the release of a product based on the user's location.
Figure 25:
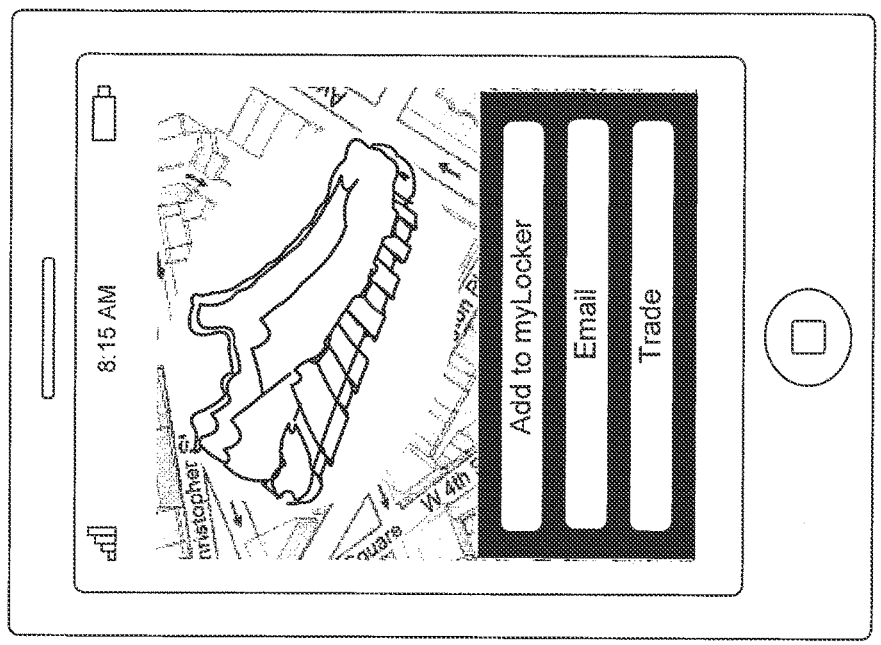
FIG. 25 illustrates an example user interface screen for a mobile device application that allows a user to save, email, or trade a product being released.

FIGS. 23-26 illustrate user interface screens for the mobile computing device in which the user's location (assuming that it is the same or very similar to the mobile computing device's location) is detected. FIG. 23 is an exemplary user interface screen that notifies a user of an event that is local to the user's geographic location. The event illustrated in FIG. 23 is the release of a new style of footwear, Template A, at a particular location, London Fields. FIG. 24 illustrates a user interface screen that identifies a map with an exact location of where a new style of footwear is being released. Further, FIG. 24 identifies the time at which it will be released, permits the user to save the designer footwear in the user's allotted memory, and provides the user with the option to purchase the new designer footwear. FIG. 25 illustrates a user interface screen that also permits the user to email and trade the new design that is being released. The users may email the new designs to other users and friends to share in the event. The users may "trade" this new design for a design from another user in a barter-style exchange.

Figure 26:
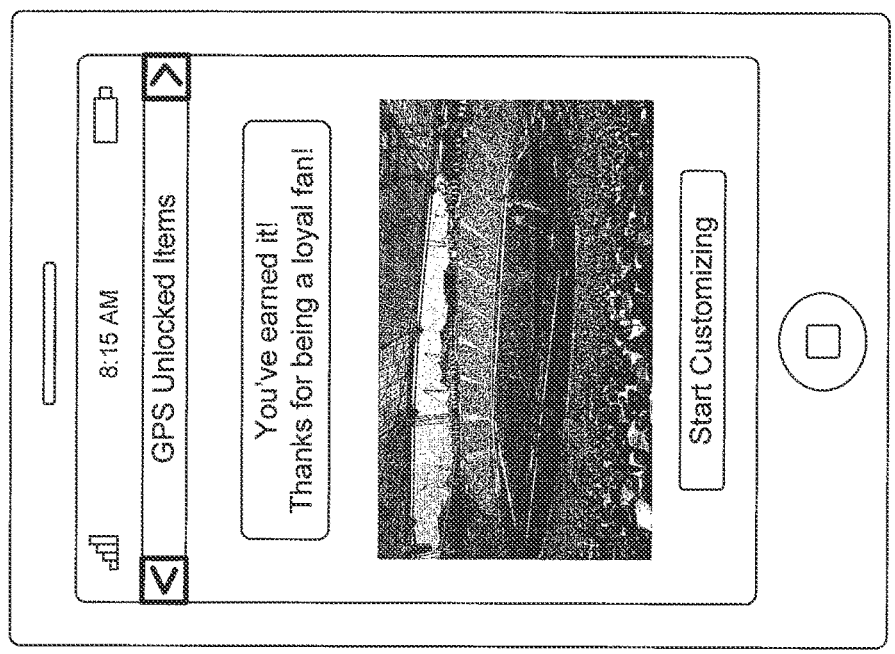
FIG. 26 illustrates an example user interface screen for a mobile device application in which the user is offered a reward or prize for being located in a particular location.

FIG. 26 illustrates a user interface screen that offers the user a reward, prize, promotion, or other incentive for being physically present in a particular location, as detected by GPS. For example, the software application may offer prizes to all users that attend a particular sporting event. In another example, the software application may offer access to a private social gathering to all users that attend a sporting event or a release of a product. In yet another example, the user's location may be used to "unlock" (make available) location-specific, limited edition products that the users may be able to purchase, personalize, and share with others. The user may be offered any item or service provided by the custom design software application based on the user's geographic location determined by locating the user's mobile computing device.

In yet another exemplary aspect of the location-specific features, a user may be able to explore a neighborhood of an athlete or other "native." These natives may be famous athletes or celebrities. The custom design software application may notify the user that the user is physically located in the neighborhood in which a particular native grew up or lives in. The notification may include information about the native and may also identify any custom designed products that the native designed, that were inspired by the native, or that have been worn or otherwise endorsed by the native. This feature also provides the user with the option to store the resulting design in the memory, share it with friends, and/or purchase the custom designed product.

The custom design software may implement a plurality of steps that may be performed or executed by a processor or multiple processors in a computing system. Such software instructions (or computer-executable instructions) may be stored in a memory and retrieved when the instruction is needed for execution. For example, when a particular feature of the custom design software described above is selected by a user, the computer-executable instructions saved in the memory may be retrieved and executed by the computing system. Such a configuration permits the user to select any feature (and its corresponding computer-executable instructions) in any order and thus each of the above-mentioned features may be performed in any desired order or may be performed without one or more of the steps.

IV. Conclusion

While the invention has been described with respect to specific examples including presently preferred modes of carrying out the invention, those skilled in the art will appreciate that numerous variations and permutations of the above described systems and techniques may be made without departing from this invention. For example, the systems, methods, and/or user interfaces may include more, less, and/or different functionality from that described above, and the various features of the systems, methods, and/or user interfaces may be activated or interacted with in various different manners (e.g., using different types of interface elements) from those described above. Also the various process steps may be changed, changed in order, some omitted, and/or include additional steps or features without departing from this invention. Various changes and modifications to the systems, methods, and user interfaces may be made without departing from the spirit and scope of the invention, as set forth in the appended claims.

What is claimed is:

1. A method of designing a product, comprising the step of:
   processing at least one visual file provided by a user as a basis for a custom design;
   generating design inspiration information based on the at least one visual file;
   automatically assigning, to the design inspiration information, a system metric identifier;
   determining, by one or more processors and based at least in part on the design inspiration information and system metric identifier, at least one color attribute for the custom design;
   determining, by the one or more processors and based at least in part on the design inspiration information and system metric identifier, at least one performance attribute for the custom design; and
   causing presentation of at least one custom designed product comprising the at least one determined color attribute and the at least one determined performance attribute.

2. The method of claim 1, wherein the at least one visual file includes a photograph.

3. The method of claim 1, wherein the product is an article of footwear.

4. The method of claim 1, wherein causing presentation of the at least one custom designed product further comprises:
   determining one or more custom designs incorporating the at least one determined color attribute and the at least one determined performance attribute.

5. The method of claim 1, further comprising:
   generating a search tag based on the design inspiration information provided by the user for the at least one custom designed product, wherein the search tag comprises the system metric identifier.

6. The method of claim 1, further comprising:
   displaying a user interface on a display device to the user, wherein the user interface includes a first user interface element that allows generation of a request to display design inspiration on the display device.

7. The method of claim 6, wherein the display device is a mobile computing device.

8. The method of claim 6, wherein the user interface includes a second user interface element that allows generation of a request to display one or more custom designs incorporating the at least one determined color attribute.

9. The method of claim 1, further comprising:
   automatically selecting, by the one or more processors, at least one color attribute for the custom design based at least in part on the design inspiration information.

10. A non-transitory computer readable medium storing executable instructions that, when executed, cause an apparatus at least to perform:
    processing at least one visual file provided by a user as a basis for a custom design;
    generating design inspiration information based on the at least one visual file;
    automatically assign, to the design inspiration information, a system metric identifier;
    determining, based at least in part on the design inspiration information and system metric identifier, at least one color attribute for the custom design;
    determining, based at least in part on the design inspiration information and system metric identifier, at least one performance attribute for the custom design based at least in part on the design inspiration information; and causing presentation of at least one custom designed product comprising the at least one determined color attribute and the at least one determined performance attribute.

11. The non-transitory computer readable medium of claim 10, wherein the executable instructions, when executed, cause the apparatus to perform:
determining one or more custom designs incorporating the at least one determined color attribute and the at least one determined performance attribute.

12. The non-transitory computer readable medium of claim 10, wherein the executable instructions, when executed, cause the apparatus to perform:
generating a search tag based on the design inspiration information provided by the user for the at least one custom designed product, wherein the search tag comprises the system metric identifier.

13. The non-transitory computer readable medium of claim 12, wherein the executable instructions, when executed, cause the apparatus to perform:
associating the generated design inspiration information with a new electronic file; and
assigning the search tag to the new electronic file.

14. The non-transitory computer readable medium of claim 10, wherein the executable instructions, when executed, cause the apparatus to perform:
displaying a user interface on a display device to the user, wherein the user interface includes a first user interface element that allows generation of a request to display design inspiration on the display device.

15. The non-transitory computer readable medium of claim 14, wherein the display device is a mobile computing device.

16. The non-transitory computer readable medium of claim 15, wherein the user interface includes a second user interface element that allows generation of a request to display one or more custom designs incorporating the at least one determined color attribute.

17. The non-transitory computer readable medium of claim 10, wherein the executable instructions, when executed, cause the apparatus to perform:
automatically selecting at least one color attribute for the custom design based at least in part on the design inspiration information.

18. An apparatus, comprising:
one or more processors, and
memory storing a plurality of electronic files each associated with a different custom design, the memory having stored therein machine executable instructions, that when executed, cause the apparatus at least to perform:
processing at least one visual file provided by a user as a basis for a custom design;
generating design inspiration information based on the at least one visual file;
automatically assigning, to the design inspiration information, a system metric identifier;
determining, based at least in part on the design inspiration information and system metric identifier, at least one color attribute for the custom design;
determining, based at least in part on the design inspiration information and system metric identifier, at least one performance attribute for the custom design; and
causing presentation of at least one custom designed product comprising the at least one determined color attribute and the at least one determined performance attribute.

19. The apparatus of claim 18, wherein the executable instructions, when executed, further cause the apparatus to perform:
identifying one or more electronic files in the plurality of electronic files associated with custom designs that incorporates the at least one determined color attribute and the at least one determined performance attribute.

20. The apparatus of claim 18, wherein the at least one visual file includes a photograph.

* * * * *